(12) United States Patent
Yagi

(10) Patent No.: US 11,762,309 B2
(45) Date of Patent: Sep. 19, 2023

(54) LIGHT EMITTING DEVICE AND IMAGE FORMING APPARATUS

(71) Applicant: FUJIFILM Business Innovation Corp., Tokyo (JP)

(72) Inventor: Kyoji Yagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 216 days.

(21) Appl. No.: 17/320,578

(22) Filed: May 14, 2021

(65) Prior Publication Data

US 2022/0091533 A1 Mar. 24, 2022

(30) Foreign Application Priority Data

Sep. 24, 2020 (JP) ................................. 2020-159618

(51) Int. Cl.
*G03G 15/04* (2006.01)
*G03G 15/043* (2006.01)
*H04N 1/00* (2006.01)
*H04N 1/29* (2006.01)

(52) U.S. Cl.
CPC ....... *G03G 15/043* (2013.01); *H04N 1/00798* (2013.01); *H04N 1/295* (2013.01)

(58) Field of Classification Search
CPC ........... G03G 15/043; G03G 15/04054; H04N 1/00798; H04N 1/295
See application file for complete search history.

(56) References Cited

U.S. PATENT DOCUMENTS

| 2010/0328416 | A1* | 12/2010 | Ikeda ................. H04N 1/40031 |
| | | | 315/297 |
| 2012/0195608 | A1* | 8/2012 | Yokoi ........................ B41J 2/45 |
| | | | 399/51 |
| 2014/0043380 | A1* | 2/2014 | Ichioka ..................... H04N 5/66 |
| | | | 345/77 |
| 2017/0045839 | A1* | 2/2017 | Takaishi ................. G03G 15/55 |
| 2020/0004173 | A1* | 1/2020 | Yoshida ............... G03G 15/043 |
| 2021/0072661 | A1* | 3/2021 | Suzuki ................. G03G 15/043 |
| 2021/0103231 | A1* | 4/2021 | Seki ........................... B41J 2/45 |
| 2022/0091532 | A1* | 3/2022 | Arai ...................... G03G 15/043 |

FOREIGN PATENT DOCUMENTS

| JP | 2017-037217 A | | 2/2017 |
| JP | 2018134820 A | * | 8/2018 |
| JP | 2020006540 A | * | 1/2020 |

\* cited by examiner

*Primary Examiner* — Francis C Gray
(74) *Attorney, Agent, or Firm* — Sughrue Mion, PLLC

(57) ABSTRACT

A light emitting device includes a light-emitting element row that includes light emitting elements arranged in a row in a main scanning direction, an optical element that is used for forming an electrostatic latent image by focusing light outputs of the light emitting elements and exposing a photoconductor to light and a control unit that controls light emission of the light-emitting element row. The light-emitting element row is divided into groups, and the control unit uniformly corrects a light intensity of each of the light emitting elements included in the groups on a group-by-group basis by a first correction method so as to correct density unevenness in the main scanning direction.

7 Claims, 20 Drawing Sheets

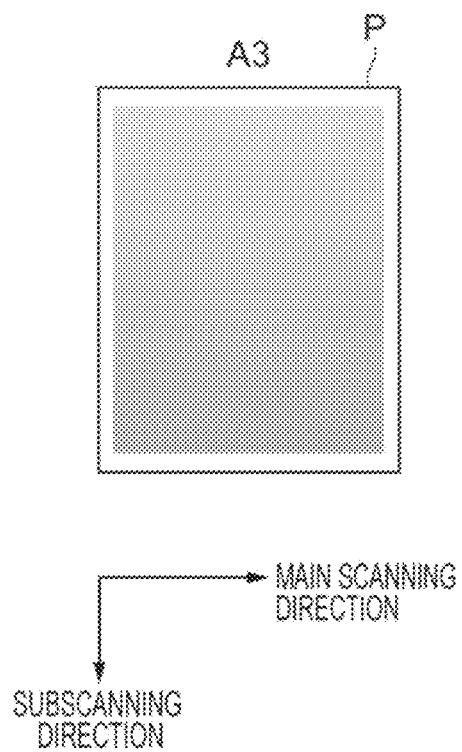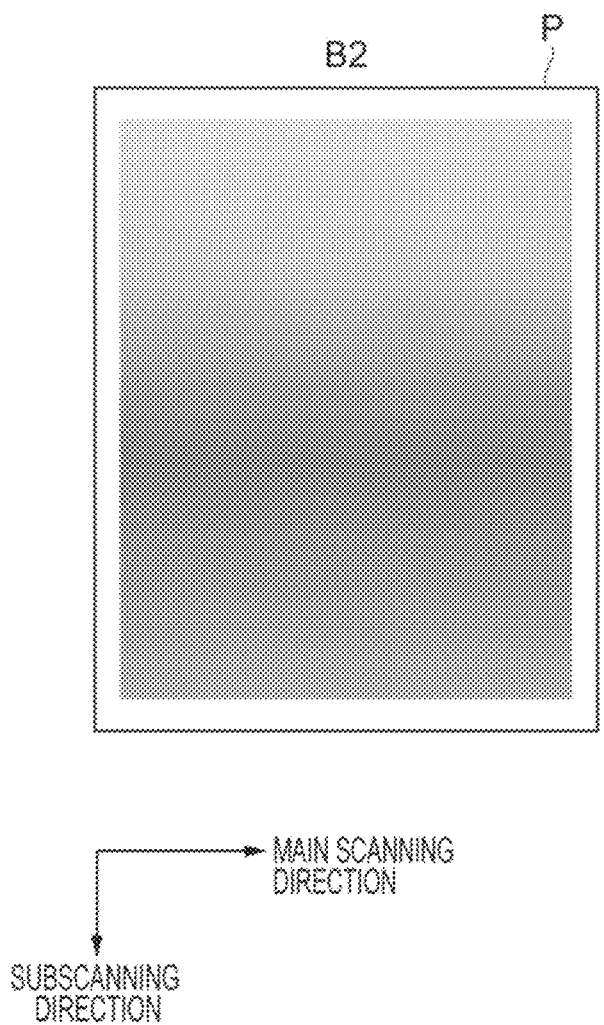

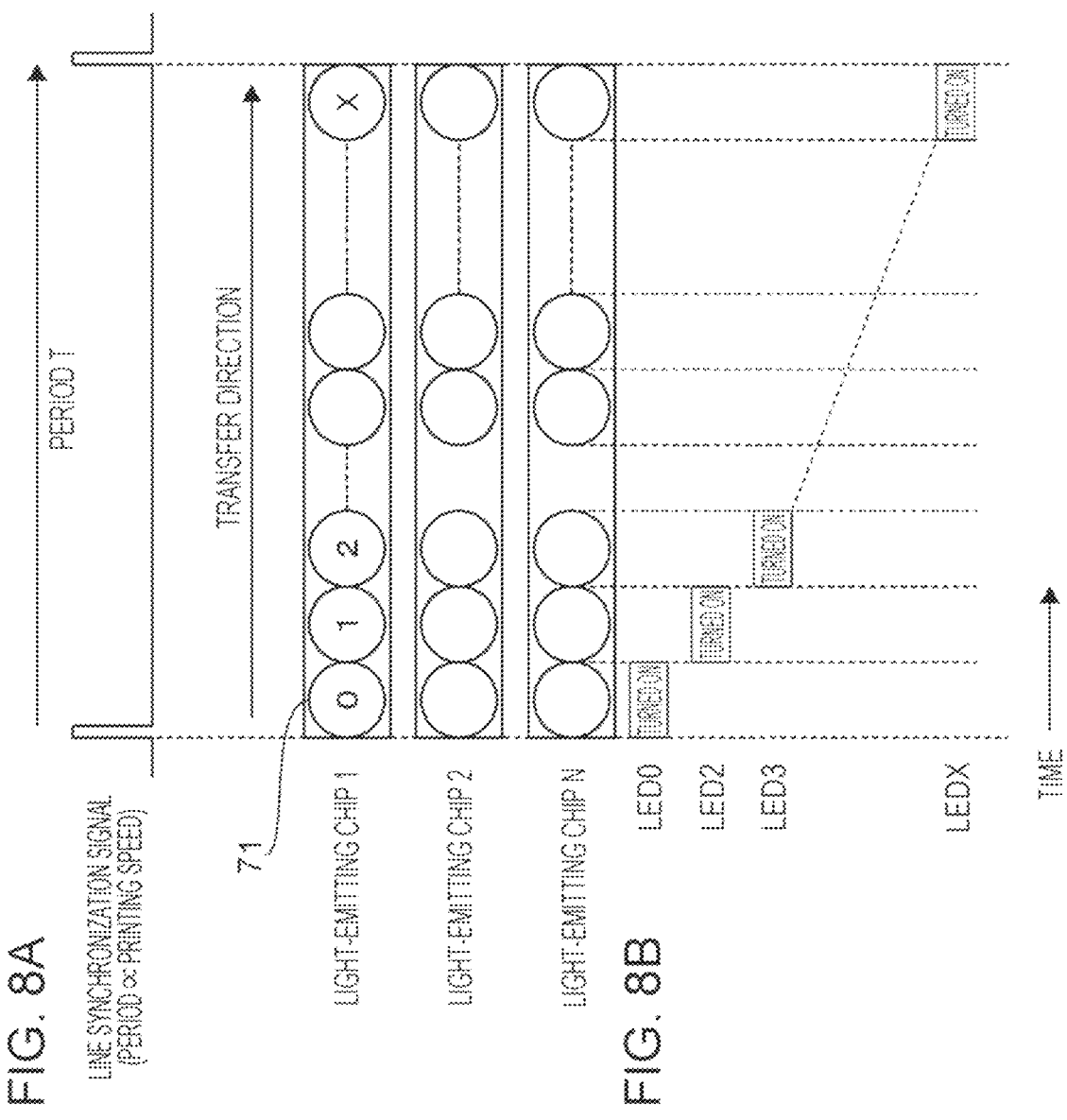

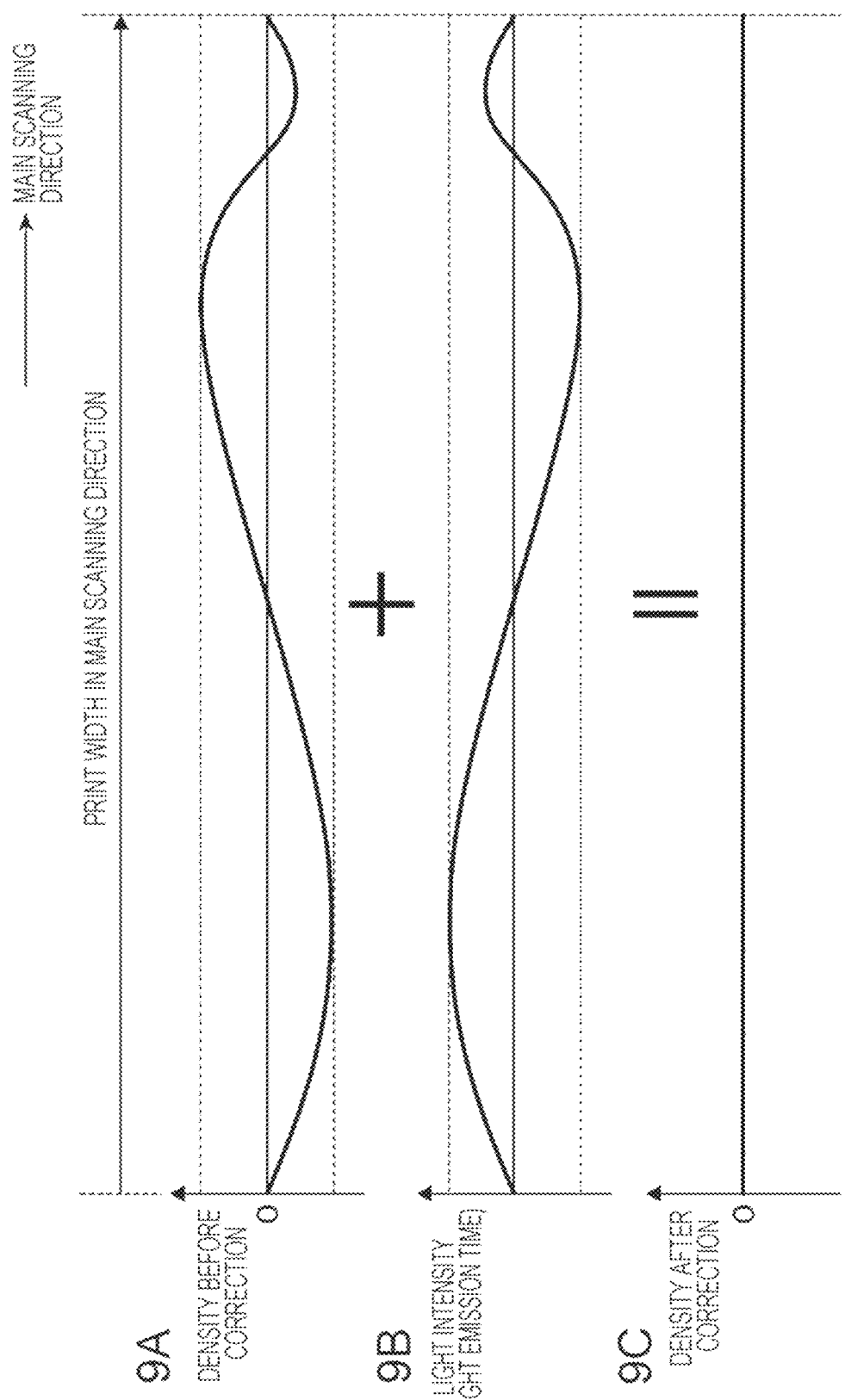

LIGHT EMITTING DEVICE AND IMAGE FORMING APPARATUS

CROSS-REFERENCE TO RELATED APPLICATIONS

This application is based on and claims priority under 35 USC 119 from Japanese Patent Application No. 2020-159618 filed Sep. 24, 2020.

BACKGROUND

(i) Technical Field

The present disclosure relates to a light emitting device and an image forming apparatus.

(ii) Related Art

In an image forming apparatus, such as a printer, a copying machine, or a facsimile machine, that employs an electrophotographic system, image formation is performed by in the following manner. An optical recording unit radiates image information onto a charged photoconductor, so that an electrostatic latent image is obtained. Then, the electrostatic latent image is visualized with a toner and transferred and fixed onto a recording medium. As such an optical recording unit, in the related art, an optical recording unit that uses a light emitting device formed by arranging a large number of light emitting elements such as light emitting diodes (LEDs) in a main scanning direction is employed as well as an optical recording unit that employs an optical scanning system for performing light exposure by using a laser to cause a laser beam to scan in a main scanning direction.

Japanese Unexamined Patent Application Publication No. 2017-37217 discloses an image forming apparatus. In the image forming apparatus, a scanning unit reads a test chart that is formed on a recording medium by an image forming section. A control unit determines the densities in regions of an image of the test chart read by the scanning unit, each of the regions corresponding to one of chips included in an LED print head (LPH) of an exposure device. The control unit determines the correction amount of the intensity of light emitted by each of the chips of the LPH from the density of the image of the test chart. The control unit corrects the intensity of the light emitted by each of the chips in accordance with the determined correction amount. An image of the test chart is formed again by the LPH with the corrected intensity of the light, and the scanning unit reads the formed image. The control unit determines the correction amount of the intensity of the light emitted by each of the chips of the LPH from the density of the image of the test chart and changes a coefficient for adjusting the correction amounts by using the determined correction amounts and the previous correction amounts.

SUMMARY

However, there are variations in light intensity among light emitting elements, and if correction of the light intensity is not performed, density unevenness occurs in an image that is formed. Light intensity correction is performed by, for example, adjusting a light emission time. In recent years, there has been a demand for increasing the width or the speed of a light emitting device so as to make the light emitting device compatible with a wide recording medium.

In this case, the light emission time assigned to each light emitting element is short, and it may sometimes be difficult to perform an adjustment for increasing the light emission time in order to correct the light intensity.

Aspects of non-limiting embodiments of the present disclosure relate to providing a light emitting device and the like capable of causing light to, when correction of density unevenness is performed, scan at higher speed while the light emission time assigned to each light emitting element is ensured compared with the case of not employing a method in which a light-emitting-element row is divided into a plurality of groups and in which light intensity correction is performed on a group-by-group basis by a first correction method.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a light emitting device including a light-emitting-element row that includes light emitting elements arranged in a row in a main scanning direction, an optical element that is used for forming an electrostatic latent image by focusing light outputs of the light emitting elements and exposing a photoconductor to light, and a control unit that controls light emission of the light-emitting element row. The light-emitting element row is divided into a plurality of groups, and the control unit uniformly corrects a light intensity of each of the light emitting elements included in the groups on a group-by-group basis by a first correction method so as to correct density unevenness in the main scanning direction.

BRIEF DESCRIPTION OF THE DRAWINGS

An exemplary embodiment of the present disclosure will be described in detail based on the following figures, wherein:

FIGS. 7A to 7D are diagrams illustrating density unevenness that occurs in an image formed on a sheet;

FIGS. 9A to 9C are diagrams illustrating a method of correcting density unevenness that has been employed in the related art and in which correction is performed by only adjusting the light emission time of LEDs;

DETAILED DESCRIPTION

<Description of Overall Configuration of Image Forming Apparatus>

An exemplary embodiment of the present disclosure will be described in detail below with reference to the accompanying drawings.

Figure 1:
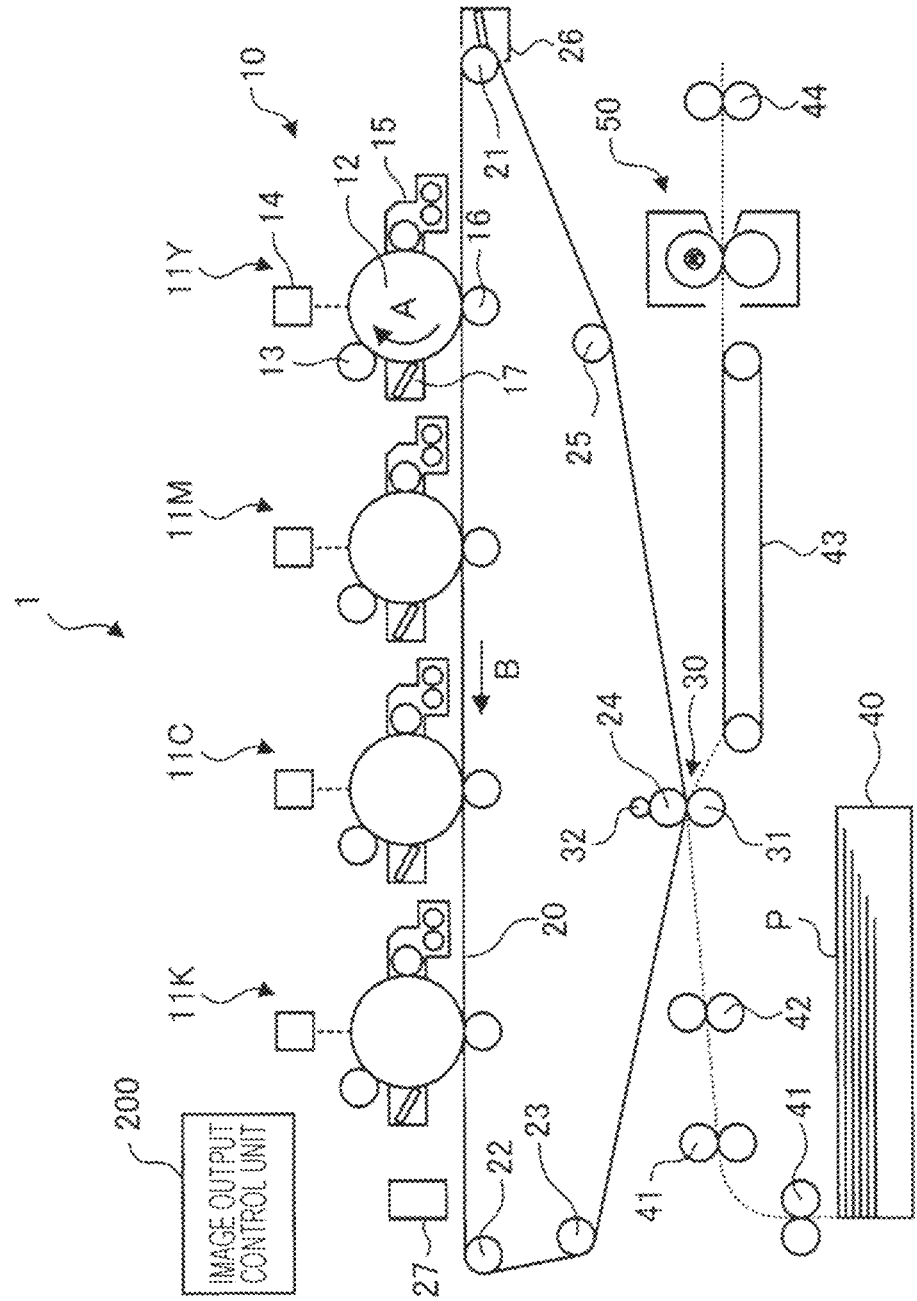
FIG. 1 is a diagram illustrating an overview of an image forming apparatus of the present exemplary embodiment.

FIG. 1 is a diagram illustrating an overview of an image forming apparatus 1 of the present exemplary embodiment.

The image forming apparatus 1 is a generally called tandem-type image forming apparatus. The image forming apparatus 1 includes an image forming section 10 that performs image formation in accordance with image data components of different colors. The image forming apparatus 1 further includes an intermediate transfer belt 20 onto which toner images of different color components that are formed by image forming units 11 are sequentially transferred (in a first transfer process) and held. The image forming apparatus 1 further includes a second transfer device 30 that collectively transfers (in a second transfer process) toner images transferred to the intermediate transfer belt 20 onto one of sheets P, which is an example of a recording medium. The image forming apparatus 1 further includes a fixing device 50 that is an example of a fixing unit and that fixes toner images that have been transferred in the second transfer process to the sheet P onto the sheet P so as to form an image. The image forming apparatus 1 further includes an image-output control unit 200 that controls each mechanism part of the image forming apparatus 1 and performs predetermined image processing on image data.

The image forming section 10 include, for example, the plurality of (four in the present exemplary embodiment) image forming units 11 (specifically, 11Y (yellow), 11M (magenta), 11C (cyan), and 11K (black)) that employ an electrophotographic system and form toner images of the different color components. Each of the image forming units 11 is an example of a toner-image forming unit that forms a toner image.

The image forming units 11 (11Y, 11M, 11C, 11K) have the same configuration except with regard to the colors of toners to be used. Accordingly, the image forming unit 11Y, which corresponds to yellow, will be described below as an example. The image forming unit 11Y corresponding to yellow includes a photoconductor drum 12 that has a photosensitive layer (not illustrated) and that is disposed so as to be rotatable in the direction of arrow A. A charging roller 13, a light-emitting element head 14, a developing unit 15, a first transfer roller 16, and a drum cleaner 17 are arranged around the photoconductor drum 12. The charging roller 13 is disposed so as to be rotatable while being in contact with the photoconductor drum 12 and charges the photoconductor drum 12 to a predetermined potential. The light-emitting element head 14 radiates light onto the photoconductor drum 12 charged to the predetermined potential by the charging roller 13 so as to write an electrostatic latent image onto the photoconductor drum 12. The developing unit 15 contains a toner having the corresponding color component (yellow toner for the image forming unit 11Y) and develops an electrostatic latent image on the photoconductor drum 12 with the toner. The first transfer roller 16 transfers a toner image formed on the photoconductor drum 12 onto the intermediate transfer belt 20 in the first transfer process. The drum cleaner 17 removes residues (such as toner) on the photoconductor drum 12 after the first transfer process.

The photoconductor drum 12 functions as an image carrier that carries an image. The charging roller 13 functions as a charging unit that charges a surface of the photoconductor drum 12. The light-emitting element head 14 functions as an electrostatic-latent-image forming unit (a light emitting device) that forms an electrostatic latent image by exposing the photoconductor drum 12 to light. The developing unit 15 functions as a developing unit that forms a toner image by developing an electrostatic latent image.

The intermediate transfer belt 20 that serves as an image transfer member is rotatably stretched and supported by a plurality of (five in the present exemplary embodiment) support rollers. Among these support rollers, a driving roller 21 stretches the intermediate transfer belt 20 and drives the intermediate transfer belt 20 such that the intermediate transfer belt 20 rotates. Stretching rollers 22 and 25 stretch the intermediate transfer belt 20 and rotate along with the intermediate transfer belt 20 driven by the driving roller 21. A correction roller 23 stretches the intermediate transfer belt 20 and functions as a steering roller that restricts a serpentine movement of the intermediate transfer belt 20 in a direction substantially perpendicular to a transport direction (and that is disposed so as to be freely movable in a tilting manner while an end portion thereof in an axial direction serves as a fulcrum). A backup roller 24 stretches the intermediate transfer belt 20 and functions as a component member of the second transfer device 30, which will be described later.

In addition, a belt cleaner 26 that removes residues (such as toner) on the intermediate transfer belt 20 after the second transfer process is disposed at a position facing the driving roller 21 with the intermediate transfer belt 20 interposed therebetween.

Although it will be described in detail later, in the present exemplary embodiment, the image forming units 11 form images for density correction (reference patches, toner images for density correction) having a predetermined density in order to correct the densities of images. Each of these images for density correction is an example of an image for adjusting the state of the apparatus.

The second transfer device 30 includes a second transfer roller 31 that is disposed so as to be press-contacted against a surface of the intermediate transfer belt 20 on which toner images are to be held and the backup roller 24 that is disposed on the rear surface side of the intermediate transfer belt 20 and serves as an electrode facing the second transfer roller 31. A power supplying roller 32 that applies a second transfer bias having a polarity the same as the charge polarity of the toner to the backup roller 24 is disposed so as to be in contact with the backup roller 24. In contrast, the second transfer roller 31 is grounded.

In the image forming apparatus 1 of the present exemplary embodiment, the intermediate transfer belt 20, the first transfer roller 16, and the second transfer roller 31 form a transfer unit that transfers toner images onto the sheets P.

A sheet transport system includes a sheet tray 40, transport rollers 41, a registration roller 42, a transport belt 43, and an ejection roller 44. In the sheet transport system, one of the sheets P that are stacked in the sheet tray 40 is transported by the transport rollers 41, and then, the transportation of the sheet P is temporarily stopped by the registration roller 42. After that, the sheet P is sent to a second transfer position of the second transfer device 30 at a predetermined timing. After the second transfer process has been performed on the sheet P, the sheet P is transported to the fixing device 50 by the transport belt 43, and the sheet P that is ejected from the fixing device 50 is discharged to the outside of the image forming apparatus 1 by the ejection roller 44.

A basic image forming process of the image forming apparatus 1 will now be described. In response to a start switch (not illustrated) being switched on, a predetermined image forming process is performed. More specifically, in the case where the image forming apparatus 1 is configured as, for example, a printer, the image-output control unit 200 first receives image data input from an external apparatus such as a personal computer (PC). The image-output control unit 200 performs image processing on the received image data and supplies the image data to the image forming units 11. Then, the image forming units 11 form toner images of the different colors. In other words, the image forming units 11 (specifically, 11Y, 11M, 11C, and 11K) are driven in accordance with digital-image signals corresponding to the different colors. Next, in each of the image forming units 11, the light-emitting element head (LPH) 14 radiates light that corresponds to the digital-image signal onto the photoconductor drum 12 charged by the charging roller 13, so that an electrostatic latent image is formed. Then, each of the electrostatic latent images formed on the photoconductor drums 12 is developed by the corresponding developing unit 15, so that toner images of the different colors are formed. Note that, in the case where the image forming apparatus 1 is configured as a copying machine, a scanner may read a document set on a document table (not illustrated), and obtained read signals may be converted into digital-image signals by a processing circuit. After that, formation of toner images of the different colors may be performed in a manner similar to the above.

Subsequently, the toner images formed on the photoconductor drums 12 are sequentially transferred, in the first transfer process, onto the surface of the intermediate transfer belt 20 by the first transfer rollers 16 at first transfer positions where the photoconductor drums 12 and the intermediate transfer belt 20 are in contact with each other. The toner remaining on each of the photoconductor drums 12 after the first transfer process is removed by the corresponding drum cleaner 17.

The toner images transferred to the intermediate transfer belt 20 in the first transfer process in the manner described above are superposed with one another on the intermediate transfer belt 20 and transported to the second transfer position along with rotation of the intermediate transfer belt 20. In contrast, one of the sheets P is transported to the second transfer position at a predetermined timing and nipped between the backup roller 24 and the second transfer roller 31.

At the second transfer position, a transfer electric field that is generated between the second transfer roller 31 and the backup roller 24 acts on the toner images on the intermediate transfer belt 20 such that the toner images are transferred onto the sheet P in the second transfer process. The sheet P to which the toner images have been transferred is transported to the fixing device 50 by the transport belt 43. In the fixing device 50, the toner images on the sheet P are heated and pressurized so as to be fixed onto the sheet P, and then, the sheet P is sent out to a paper output tray (not illustrated) that is provided outside the image forming apparatus 1. The toner remaining on the intermediate transfer belt 20 after the second transfer process is removed by the belt cleaner 26.

<Description of Light-Emitting Element Head 14>

Figure 2:
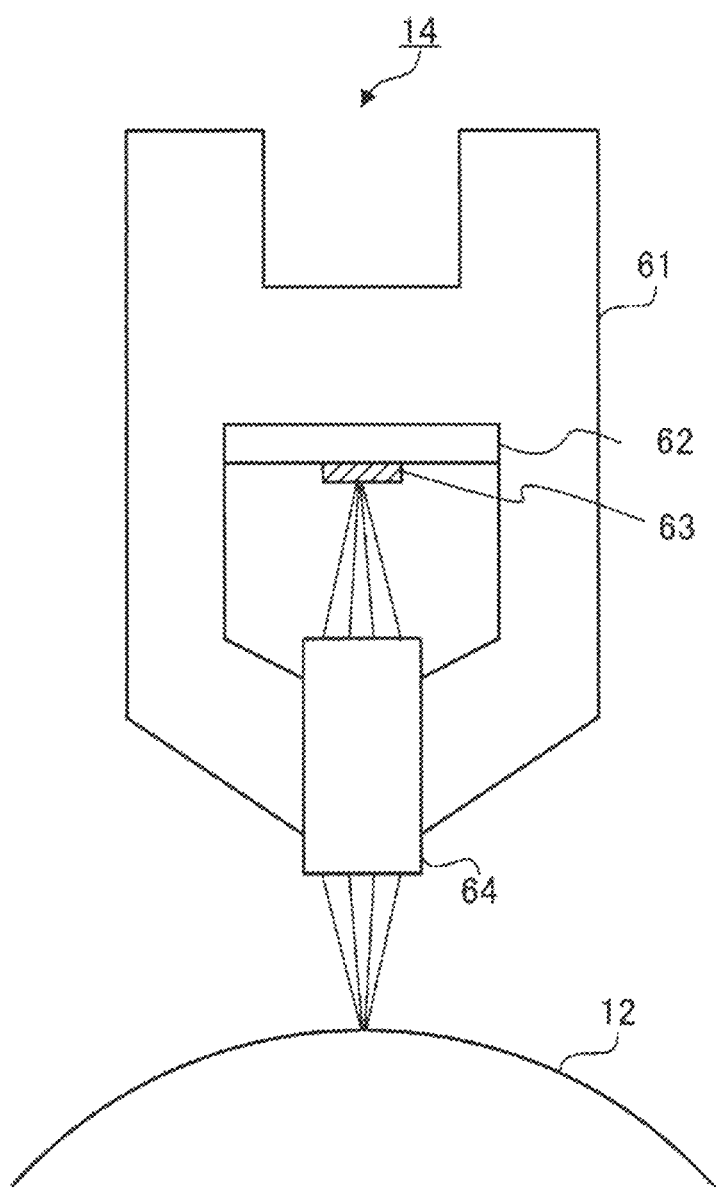
FIG. 2 is a diagram illustrating a configuration of a light-emitting element head to which the present exemplary embodiment is applied.

FIG. 2 is a diagram illustrating the configuration of one of the light-emitting element heads 14 to which the present exemplary embodiment is applied.

The light-emitting element head 14 is an example of a light emitting device and includes a housing 61, a light emitting unit 63 including a plurality of LEDs as light emitting elements, a circuit board 62 on which the light emitting unit 63, a signal generation circuit 100 (see FIG. 3, which will be described later), and so forth are mounted, and a rod lens (radial refractive index distributed lens) array 64 that is an example of an optical element for forming an electrostatic latent image by focusing the light outputs emitted by LEDs and exposing a photoconductor to light.

The housing 61 is made of, for example, a metal and supports the circuit board 62 and the rod lens array 64, and the light emitting point of the light emitting unit 63 and the focal plane of the rod lens array 64 are set to coincide with each other. The rod lens array 64 is disposed along the axial direction of the photoconductor drum 12 (a main scanning direction).

<Description of Light Emitting Unit 63>

Figure 3A:
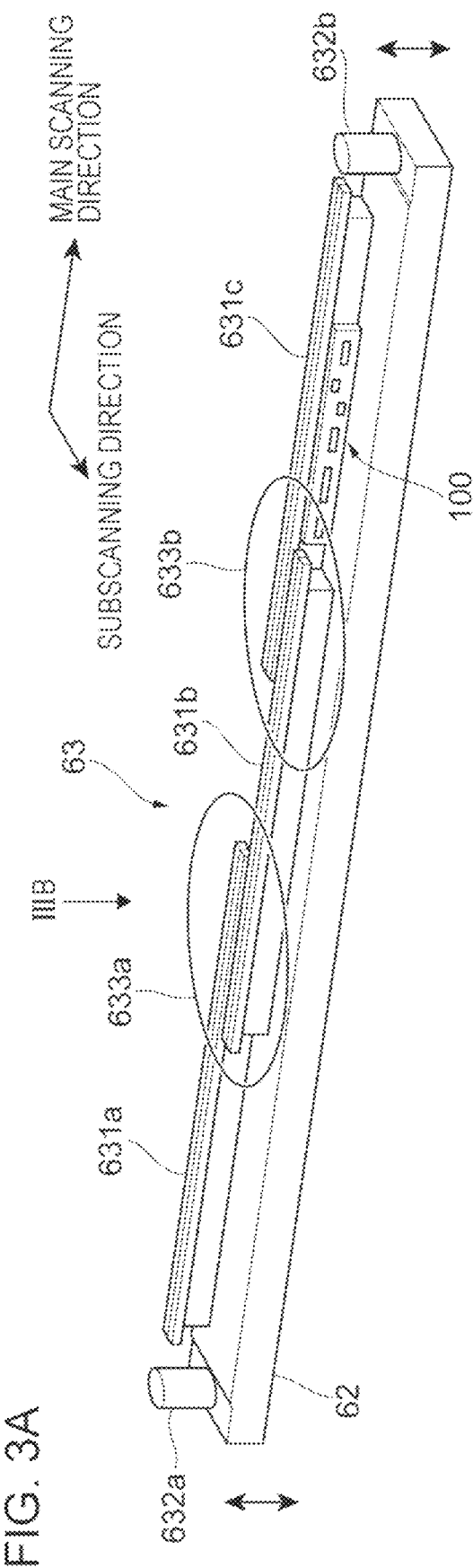
FIG. 3A is a perspective view of a circuit board and a light emitting unit that are included in the light-emitting element head.

FIG. 3A is a perspective view of the circuit board 62 and the light emitting unit 63 included in each of the light-emitting element heads 14. As illustrated in FIG. 3A, the light emitting unit 63 includes LPH bars 631$a$ to 631$c$, focus adjustment pins 632$a$ and 632$b$, and the signal generation circuit 100, which is an example of a control unit that controls light emission of LEDs.

The LPH bars 631$a$ to 631$c$ are arranged on the circuit board 62 in a staggered manner in the main scanning direction. The LPH bars 631$a$ to 631$c$ are arranged in such a manner that each pair of the LPH bars that are adjacent to each other in the main scanning direction partially overlap each other in a subscanning direction, so that joint portions 633$a$ and 633$b$ are formed. In this case, the joint portion 633$a$ is formed by arranging the LPH bar 631$a$ and the LPH bar 631$b$ such that these LPH bars overlap each other in the subscanning direction, and the joint portion 633$b$ is formed by arranging the LPH bar 631$b$ and the LPH bar 631$c$ such that these LPH bars overlap each other in the subscanning direction.

Note that, when there is no need to distinguish the LPH bars 631$a$ to 631$c$ from one another, the LPH bars 631$a$ to 631$c$ will hereinafter sometimes be simply referred to as LPH bars 631. In addition, when there is no need to distinguish the focus adjustment pins 632$a$ and 632$b$ from each other, the focus adjustment pins 632$a$ and 632$b$ will hereinafter sometimes be simply referred to as focus adjustment pins 632. Furthermore, when there is no need to distinguish the joint portions 633a and 633b from each other, the joint portions 633a and 633b will hereinafter sometimes be simply referred to as joint portions 633.

Figure 3B:
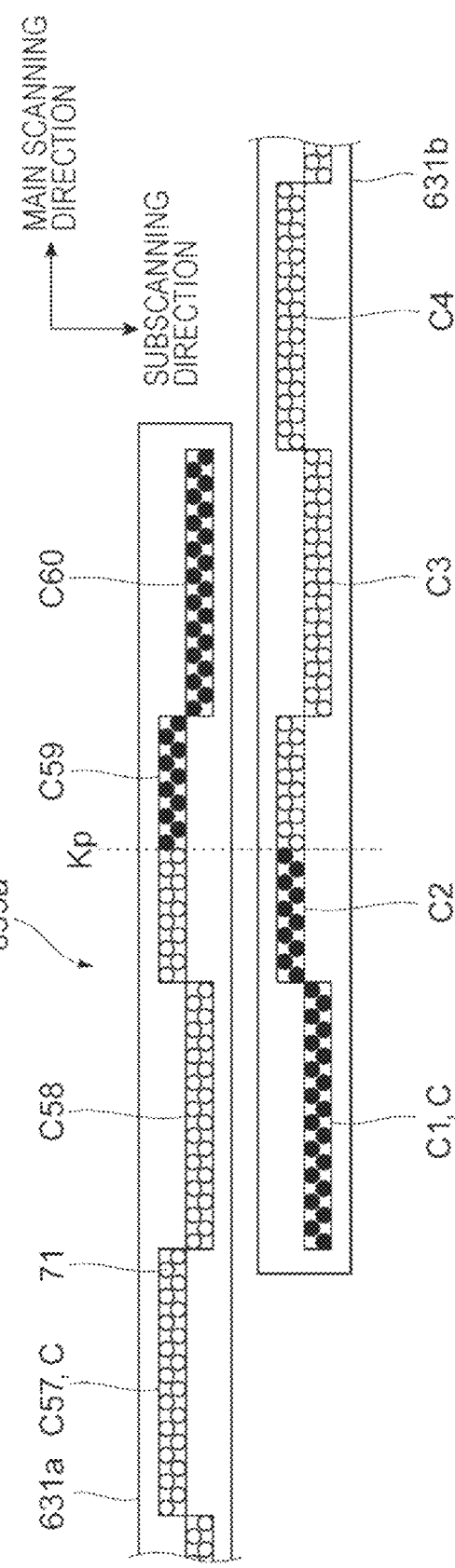
FIG. 3B is a view when the light emitting unit is viewed in a direction of arrow IIIB in FIG. 3A and is an enlarged view of a portion of the light emitting unit.

FIG. 3B is a view when the light emitting unit 63 is viewed in a direction of arrow IIIB in FIG. 3A and is an enlarged view of a portion of the light emitting unit 63. FIG. 3B illustrates the joint portion 633a of the LPH bars 631a and 631b.

As illustrated in FIG. 3B, the LPH bar 631a and the LPH bar 631b include light emitting chips C each of which is an example of a light-emitting-element array chip. The light emitting chips C are arranged in two staggered rows along the main scanning direction so as to face each other. The number of the light emitting chips C included in each of the LPH bars 631a and 631b is, for example, 60. Note that, the 60 light emitting chips C will hereinafter sometimes be referred to as light emitting chips C1 to C60. As illustrated in FIG. 3B, each of the light emitting chips C includes LEDs 71. In other words, in this case, a predetermined number of LEDs 71 are included in each of the light emitting chips C, and the LEDs 71 are aligned in the main scanning direction. In addition, the LEDs 71 in each of the light emitting chips C are sequentially turned on in the main scanning direction or a direction opposite to the main scanning direction.

Note that, although not illustrated in FIG. 3B, the LPH bar 631c has a configuration similar to that of each of the LPH bars 631a and 631b. In addition, the joint portion 633b has a configuration similar to that of the joint portion 633a.

According to the above-described configuration, the plurality of LEDs 71 included in the LPH bar 631a to the LPH bar 631c may be considered as the LEDs 71 that are arranged in rows in the main scanning direction and that forms a light-emitting-element row.

A switching point Kp is set at a position in each of the joint portions 633a and 633b, and the light-emitting-element row that is to be caused to emit light is switched between the first light-emitting-element row and the second light-emitting-element row at the switching point Kp. In other words, the LPH bar 631 to be turned on is switched at the switching point Kp. In this case, the LEDs 71 of the LPH bars 631 are turned on in the order of the LEDs 71 of the LPH bar 631a, the LEDs 71 of the LPH bar 631b, and the LEDs 71 of the LPH bar 631c.

In FIG. 3B, the LEDs 71 represented by white circles are turned on, and the LED 71 represented by black circles are not turned on. In other words, in FIG. 3B, the LEDs 71 to be turned on are switched from the LEDs 71 of the LPH bar 631a to the LEDs 71 of the LPH bar 631b at the switching point Kp. In FIG. 3B, the LEDs 71 of the LPH bar 631a are turned on on the left-hand side of the switching point Kp, and the LEDs 71 of the LPH bar 631b are turned on on the right-hand side of the switching point Kp.

In the joint portion 633a and the joint portion 633b, the position of the switching point Kp may be freely set, and the signal generation circuit 100 performs switching control. Accordingly, the signal generation circuit 100 functions as a light-emission control unit that switches the light-emitting-element row to be caused to emit light between the first light-emitting-element row and the second light-emitting-element row at the switching point Kp.

The focus adjustment pins 632a and 632b enable the circuit board 62 to move in the vertical direction indicated by double-headed arrows in FIG. 3A. In other words, the circuit board 62 is capable of freely moving up and down. By causing the circuit board 62 to move up and down, the distance between the light emitting unit 63 and the photoconductor drum 12 may be changed. As a result, the distance between each of the LPH bars 631a to 631c and the photoconductor drum 12 is changed, and the focus of the light outputs emitted by the LEDs 71 and focused on the photoconductor drum 12 may be adjusted. Note that the circuit board 62 may be moved in the upward direction by the focus adjustment pins 632a and 632b on both the side on which the focus adjustment pin 632a is disposed and the side on which the focus adjustment pin 632b is disposed. The circuit board 62 may also be moved in the downward direction on both the side on which the focus adjustment pin 632a is disposed and the side on which the focus adjustment pin 632b is disposed. In addition, the circuit board 62 may be moved in the upward direction on one of the side on which the focus adjustment pin 632a is disposed and the side on which the focus adjustment pin 632b is disposed and may be moved in the downward direction on the other side. The focus adjustment pins 632a and 632b may operate in response to control by the signal generation circuit 100 or may be manually operated.

<Description of Light-Emitting-Element Array Chip>

Figure 4A:
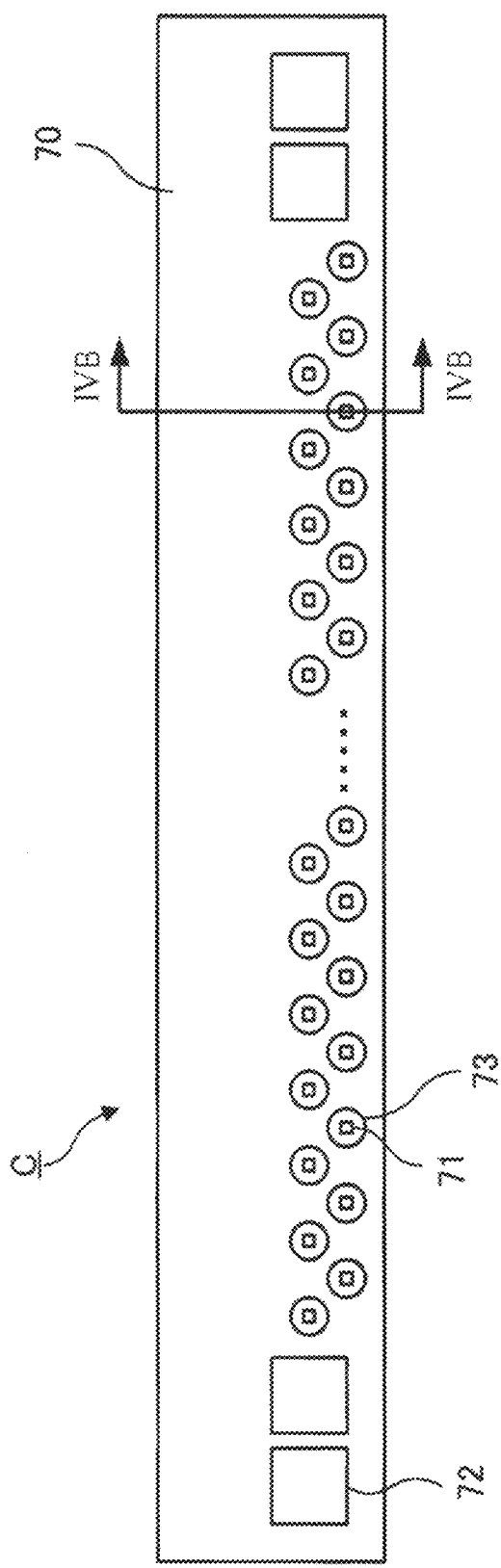
FIGS. 4A and 4B are diagrams each illustrating a structure of one of light emitting chips to which the present exemplary embodiment is applied.
Figure 4B:
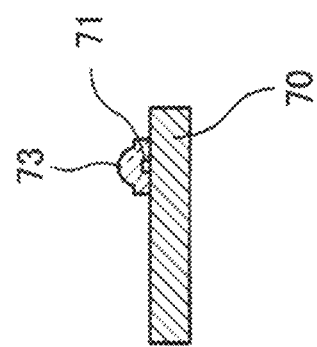

FIGS. 4A and 4B are diagrams each illustrating a structure of each of the light emitting chips C to which the present exemplary embodiment is applied.

FIG. 4A is a view when one of the light emitting chips C is viewed in a direction in which the LEDs 71 emit light. FIG. 4B is a cross-sectional view taken along line IVB-IVB of FIG. 4A.

In the light emitting chip C, the plurality of LEDs 71 are arranged in rows in the main scanning direction and equally spaced as an example of a light-emitting element array. In addition, bonding pads 72, each of which is an example of an electrode portion used for inputting and outputting a signal that drives the light-emitting element array, are provided on both sides of a substrate 70 in such a manner that the light-emitting element array is interposed between the bonding pads 72. Each of the LEDs 71 includes a microlens 73 formed on the side on which light is emitted.

The light emitted by the LED 71 is converged by the microlens 73, so that the light may be efficiently incident on the photoconductor drum 12 (see FIG. 2).

The microlens 73 is made of a transparent resin such as a photo-curable resin, and a surface of the microlens 73 may have an aspherical shape in order to converge the light more efficiently. The size, the thickness, the focal length, and so forth of the microlens 73 are set depending on the wavelength of the LED 71 that is used, the refractive index of the photo-curable resin that is used, and so forth.

<Description of Self-Scanning Light-Emitting-Device Array Chip>

Note that, in the present exemplary embodiment, a self-scanning light-emitting-device (SLED) array chip may be used as the light-emitting-element array chip, which is described as an example of each of the light emitting chips C. A self-scanning light-emitting-device array chip is configured to use a light emitting thyristor having a pnpn structure as a component of a light-emitting-element array chip so as to achieve self-scanning of a light emitting element.

Figure 5:
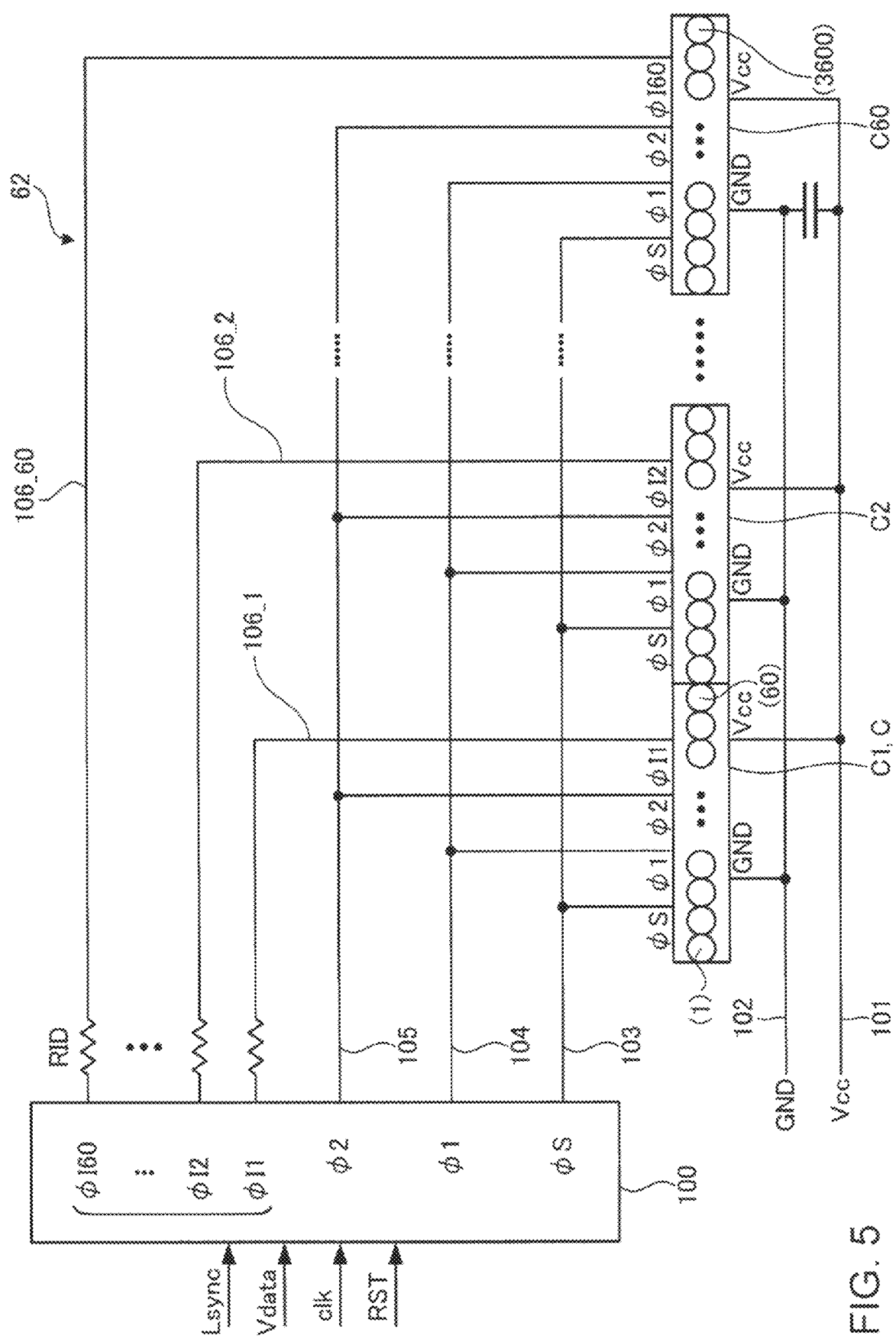
FIG. 5 is a diagram illustrating a configuration of a signal generation circuit and a wiring configuration of the circuit board in the case where a self-scanning light-emitting-device array chip is used as each of the light emitting chips.

FIG. 5 is a diagram illustrating a configuration of the signal generation circuit 100 and a wiring configuration of the circuit board 62 in the case where a self-scanning light-emitting-device array chip is used as each of the light emitting chips C.

Various control signals such as a line synchronization signal Lsync, image data Vdata, a clock signal clk, and a reset signal RST are input to the signal generation circuit 100 from the image-output control unit 200 (see FIG. 1).

The signal generation circuit 100 performs, for example, sorting of the image data Vdata, correction of an output value, and so forth on the basis of various control signals input from the outside and outputs light emission signals φI (φI1 to φI60) to the light emitting chips C (C1 to C60). Note that, in the present exemplary embodiment, each of the light emitting chips C (C1 to C60) receives one of the light emission signals φI (φI1 to φI60).

The signal generation circuit 100 outputs a start transfer signal φS, a first transfer signal φ1 and a second transfer signal φ2 to each of the light emitting chips C1 to C60 on the basis of various control signals input from the outside.

A power line 101 for a power supply voltage Vcc of −5.0 V that is connected to a Vcc terminal of each of the light emitting chips C1 to C60 and a power line 102 for grounding that is connected to a GND terminal of each of the light emitting chips C1 to C60 are arranged on the circuit board 62. In addition, a start-transfer-signal line 103, a first-transfer-signal line 104, and a second-transfer-signal line 105 that transmit the start transfer signal φS, the first transfer signal φ1 and the second transfer signal φ2 of the signal generation circuit 100, respectively, are arranged on the circuit board 62. Furthermore, 60 light-emission-signal lines 106 (106_1 to 106_60) that output the light emission signals φI (φI1 to φI60) from the signal generation circuit 100 to the light emitting chips C (C1 to C60) are arranged on the circuit board 62. Note that 60 light-emitting-current limiting resistors RID for preventing an excessive current from flowing through the 60 light-emission-signal lines 106 (106_1 to 106_60) are arranged on the circuit board 62. As will be described later, there are two possible states of each of the light emission signals φI1 to φI60, which are a high level (H) and a low level (L). The electric potential at the low level is −5.0 V, and the electric potential at the high level is ±0.0 V.

Figure 6:
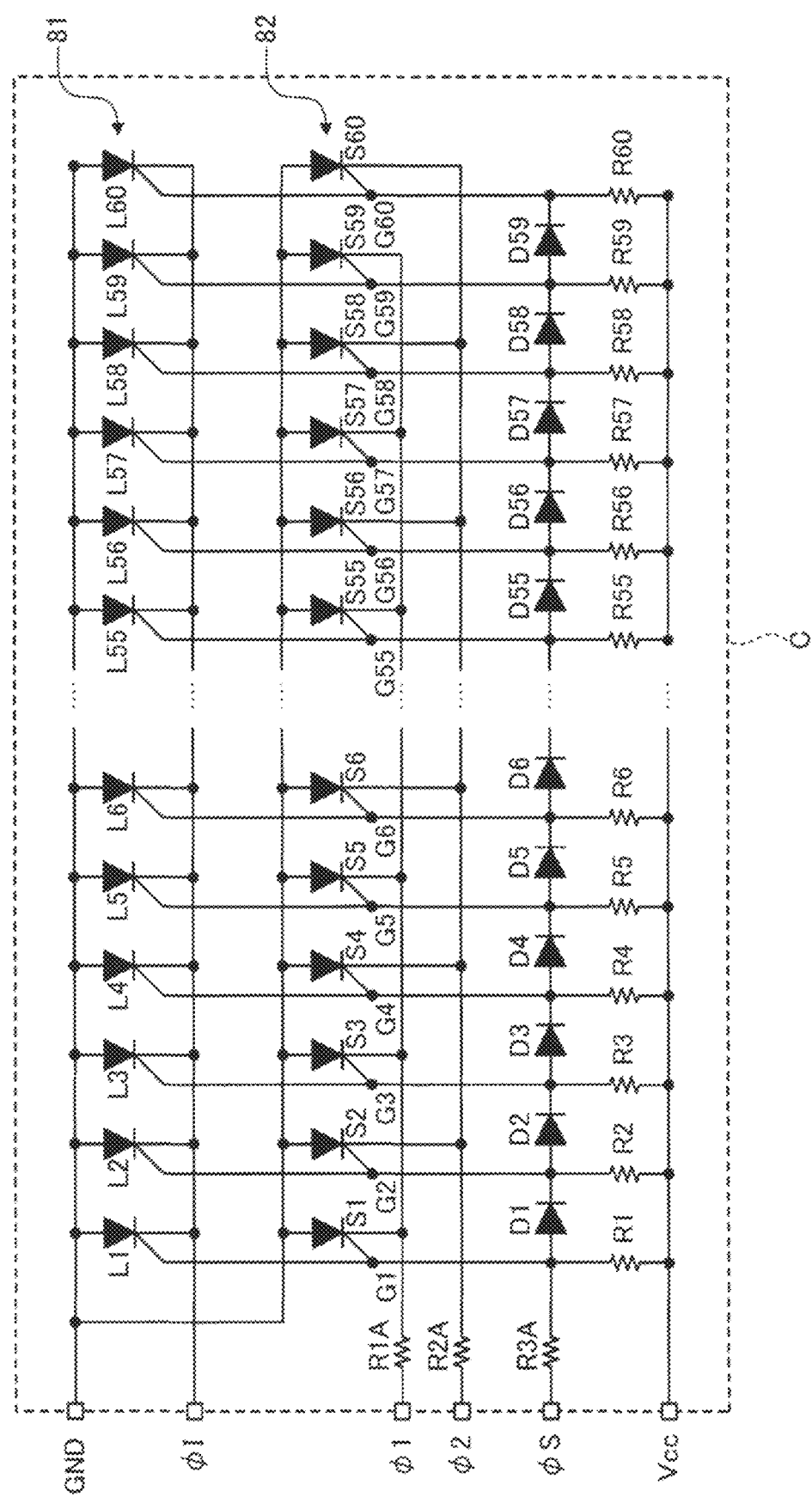
FIG. 6 is a diagram illustrating a circuit configuration of each of the light emitting chips.

FIG. 6 is a diagram illustrating a circuit configuration of each of the light emitting chips C (C1 to C60).

Each of the light emitting chips C includes 60 transfer thyristors S1 to S60 and 60 light emitting thyristors L1 to L60. Note that each of the light emitting thyristors L1 to L60 has a pnpn junction similar to that of each of the transfer thyristors S1 to S60 and is configured to also function as a light emitting diode (LED) by using a pn junction, which is part of the pnpn junction. In addition, each of the light emitting chips C includes 59 diodes D1 to D59 and 60 resistors R1 to R60. Furthermore, each of the light emitting chips C includes transfer-current limiting resistors R1A, R2A, and R3A for preventing an excessive current from flowing through signal lines to which the first transfer signal φ1, the second transfer signal φ2, and the start transfer signal φS are supplied. Note that the light emitting thyristors L1 to L60 that are included in a light-emitting element array 81 are arranged in the order of L1, L2, . . . , L59, L60 from the left-hand side in FIG. 6 so as to form a light-emitting-element row. Similarly, the transfer thyristors S1 to S60 are arranged in the order of S1, S2, . . . , S59, S60 from the left-hand side in FIG. 6 so as to form a switching element row, that is, a switching element array 82. In addition, the diodes D1 to D59 are arranged in the order of D1, D2, . . . , D58, D59 from the left-hand side in FIG. 6. Furthermore, the resistors R1 to R60 are arranged in the order of R1, R2, . . . , R59, R60 from the left-hand side in FIG. 6.

Electrical connection of each element in one of the light emitting chips C will now be described.

The anode terminal of each of the transfer thyristors S1 to S60 is connected to the GND terminal. The power line 102 (see FIG. 5) is connected to the GND terminal and grounded.

The cathode terminals of the odd-numbered transfer thyristors S1, S3, . . . , S59 are connected to a φ1 terminal via the transfer-current limiting resistor R1A. The first-transfer-signal line 104 (see FIG. 5) is connected to the φ1 terminal, and the first transfer signal φ1 is supplied to the φ1 terminal.

In contrast, the cathode terminals of the even-numbered transfer thyristors S2, S4, . . . , S60 are connected to a φ2 terminal via the transfer-current limiting resistor R2A. The second-transfer-signal line 105 (see FIG. 5) is connected to the φ2 terminal, and the second transfer signal φ2 is supplied to the φ2 terminal.

The gate terminals G1 to G60 of the transfer thyristors S1 to S60 are connected to the Vcc terminal via the resistors R1 to R60 that are arranged so as to correspond to the transfer thyristors S1 to S60, respectively. The power line 101 (see FIG. 5) is connected to the Vcc terminal, and the power supply voltage Vcc (−5.0 V) is supplied to the Vcc terminal.

In addition, the gate terminals G1 to G60 of the transfer thyristors S1 to S60 are connected in one-to-one to the gate terminals of the light emitting thyristors L1 to L60 in such a manner that the gate terminal of the transfer thyristor and the gate terminal of the light emitting thyristor that are denoted by the same number are connected to each other.

The anode terminals of the diodes D1 to D59 are connected to the gate terminals G1 to G59 of the transfer thyristors S1 to S59, and the cathode terminals of the diodes D1 to D59 are connected to the gate terminals G2 to G60 of the adjacent transfer thyristors S2 to S60 at the following stage. In other words, the diodes D1 to D59 are connected in series with the gate terminals G1 to G60 of the transfer thyristors S1 to S60 interposed therebetween.

The anode terminal of the diode D1, that is, the gate terminal G1 of the transfer thyristor S1 is connected to a φS terminal via the transfer-current limiting resistor R3A. The start transfer signal φS is supplied to the φS terminal through the start-transfer-signal line 103 (see FIG. 5).

Similar to the anode terminals of the transfer thyristors S1 to S60, the anode terminals of the light emitting thyristors L1 to L60 are connected to the GND terminal.

The cathode terminals of the light emitting thyristors L1 to L60 are connected to a φI terminal. The light-emission-signal line 106 (the light-emission-signal line 106_1 for the light emitting chip C1: see FIG. 5) is connected to the φI terminal, and the light emission signal φI (the light emission signal φ1 for the light emitting chip C1) is supplied to the φI terminal. Note that each of the light emission signals φI2 to φI60 is supplied to a corresponding one of the other light emitting chips C2 to C60.

<Description of Density Unevenness in Image>

In recent years, an increasing number of image forming apparatuses that perform printing on, for example, wide sheets such as B2 sheets are available on the market. In order to achieve an increase in the width and the speed of such an image forming apparatus, the sizes of members included in the image forming apparatus need to be increased. However, the component accuracy deteriorates due to an increase in the sizes of the members, and the number of control errors increases due to an increase in the speed, so that the degree of one-dimensional or two-dimensional density unevenness increases, which in turn results in degradation of image quality.

FIGS. 7A to 7D are diagrams illustrating density unevenness that occurs in an image formed on one of the sheets P.

FIGS. 7A and 7B each illustrates a case where density unevenness occurs in the subscanning direction. In FIG. 7A, the size of the sheet P is A3, and density unevenness occurs in the subscanning direction. In FIG. 7B, the size of the sheet P is B2, and density unevenness occurs in the subscanning direction. As illustrated in FIGS. 7A and 7B, in the subscanning direction, there are a region of higher density and a region of lower density.

Figure 7C:
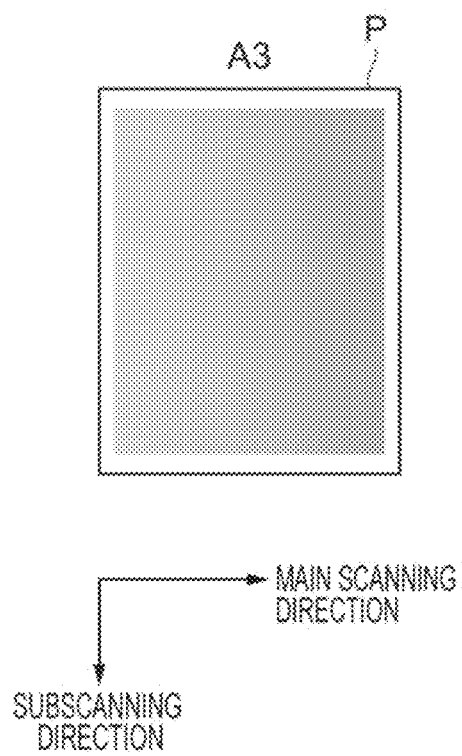
Figure 7D:
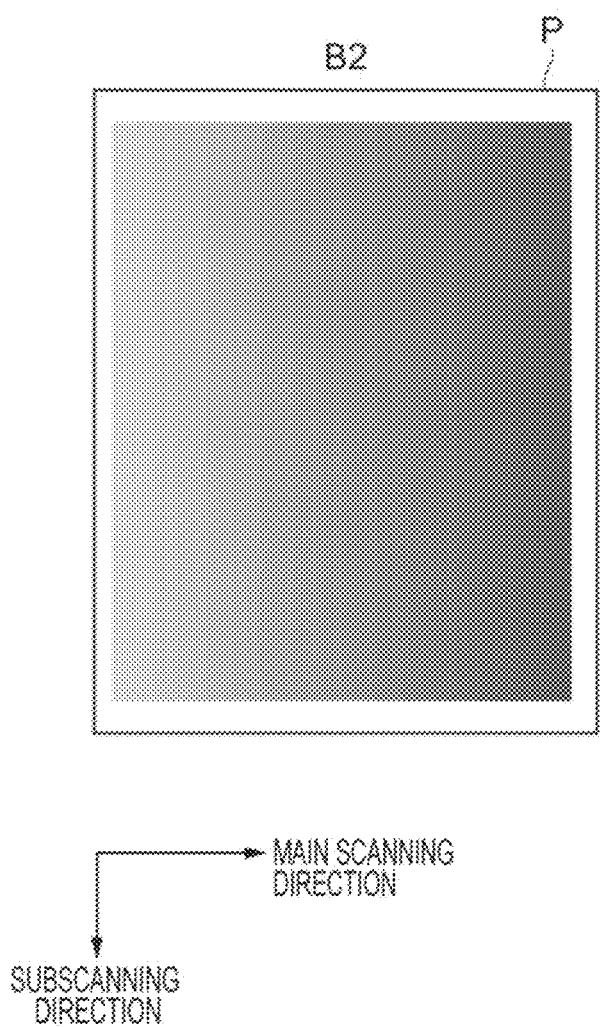

FIGS. 7C and 7D each illustrates a case where density unevenness occurs in the main scanning direction. In FIG. 7C, the size of the sheet P is A3, and density unevenness occurs in the main scanning direction. In FIG. 7D, the size of the sheet P is B2, and density unevenness occurs in the main scanning direction. As illustrated in FIGS. 7C and 7D, in the main scanning direction, there are a region of higher density and a region of lower density.

When FIGS. 7A and 7B are compared with FIGS. 7C and 7D, the density unevenness in the B2 sheet P is more noticeable than that in the A3 sheet P. In other words, the problem of density unevenness is more likely to occur as the size of the sheets P increases. Note that density unevenness may sometimes occur both in the subscanning direction and in the main scanning direction.

In order to correct density unevenness, it is necessary to ensure a wide light-intensity adjustable range. In other words, although a method of changing a light emission time may be considered as a method of adjusting the light intensity of each of the light-emitting element heads 14, when trying to ensure a wide light intensity range, it is necessary to secure a large amount of time for turning on each of the LEDs 71, and it becomes difficult to perform high-speed driving. This is likely to become a problem particularly when the light emitting chips C each having the configuration illustrated in FIG. 5 and FIG. 6 are used as will be described below.

Figure 8C:
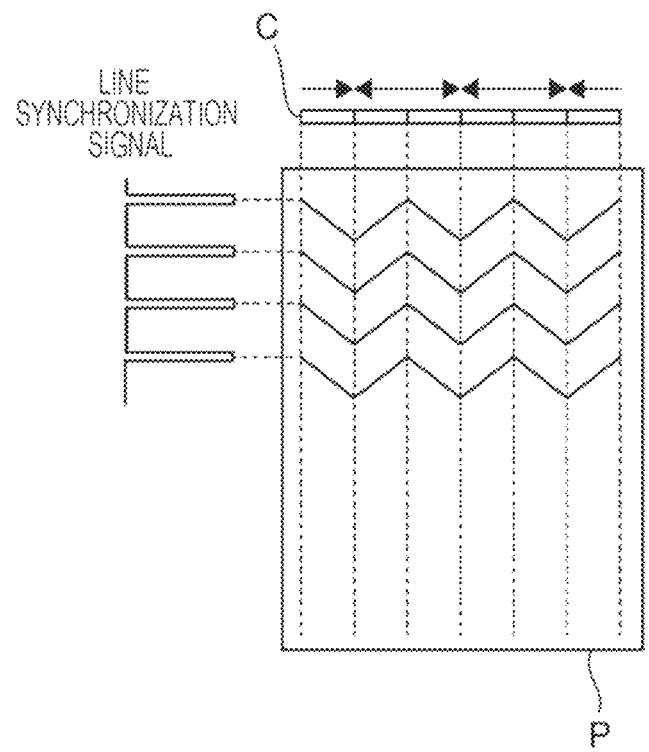
FIGS. 8A and 8B are diagrams each illustrating a state in which the light emitting chips are turned on, and FIG. 8C is a diagram illustrating an image printed on a sheet in this case.

FIGS. 8A and 8B are diagrams each illustrating a state in which the light emitting chips C are turned on. FIG. 8C is a diagram illustrating an image printed on one of the sheets P in this case.

As illustrated in FIG. 8A, the LEDs 71 of each of the light emitting chips C are sequentially turned on in a transfer direction. In other words, the LEDs 71 of each of the light emitting chips C are sequentially turned on from a transfer start direction toward a transfer end direction by a time-division driving method. FIG. 8A illustrates that the LEDs 71 that are denoted by the numbers 0 to x are sequentially turned on as the LEDs 71 included in each of the light emitting chips C. In this case, on a time axis illustrated in FIG. 8A, the LEDs 71 of the light emitting chips C do not emit light at the same time.

In addition, since the photoconductor drums 12 rotate, the LED 71 to be turned on is shifted among the LEDs 71 in the subscanning direction over time as illustrated in FIG. 8B, and an electrostatic latent image is formed on each of the photoconductor drums 12. As a result, an image also becomes misaligned in the subscanning direction and is formed onto one of the sheets P.

The transfer direction is set for each of the light emitting chips C such that the transfer directions of the adjacent light emitting chips C are opposite to each other. The transfer directions are indicated by arrows illustrated in the upper portion of FIG. 8C. As a result, as illustrated in the lower portion of FIG. 8C, the image formed on the sheet P has a zigzag shape.

In the light emitting chip C having the configuration illustrated in FIG. 5 and FIG. 6, the plurality of LEDs 71 are controllable by the same signal line, and thus, the number of signal edges may be significantly reduced. On the other hand, the length of time over which each of the LEDs 71 may be turned on is shorter than that in the case where the LEDs 71 emit light at the same time. Thus, it is likely to become difficult to secure a large amount of time for turning on each of the LEDs 71, and it is likely to become difficult to perform high-speed driving.

FIGS. 9A to 9C are diagrams illustrating a method of correcting density unevenness that has been employed in the related art and in which correction is performed by only adjusting the light emission time of the LEDs 71.

FIG. 9A illustrates density before correction. Here, the horizontal axis denotes position in the main scanning direction, and the vertical axis denotes the density of an image. FIG. 9A illustrates that the density fluctuates in the main scanning direction, so that density unevenness occurs.

FIG. 9B illustrates the correction amount that is required for each of the LEDs 71 when density unevenness such as that illustrated in FIG. 9A occurs. Correction is performed by correcting the light intensity set for each of the LEDs 71. The light intensity is adjusted by the light emission time. Accordingly, it may also be said that the horizontal axis denotes position in the main scanning direction and that the vertical axis denotes light emission time.

In this case, as illustrated in FIGS. 9A and 9B, the light emission times of the LEDs 71 are increased in a portion where the density is low, and the light emission times of the LEDs 71 are decreased in a portion where the density is high.

FIG. 9C illustrates density after correction. Here, the horizontal axis denotes position in the main scanning direction, and the vertical axis denotes the density of the image.

FIG. 9C illustrates that the fluctuations of the density in the main scanning direction is eliminated and that the density unevenness is corrected.

In this case, the average light intensity of the entire light-emitting element head 14 is adjusted by increasing or decreasing the drive voltage of the LEDs 71, and the light intensity of each of the LEDs 71 is adjusted by increasing or decreasing the light emission time.

Figure 10:
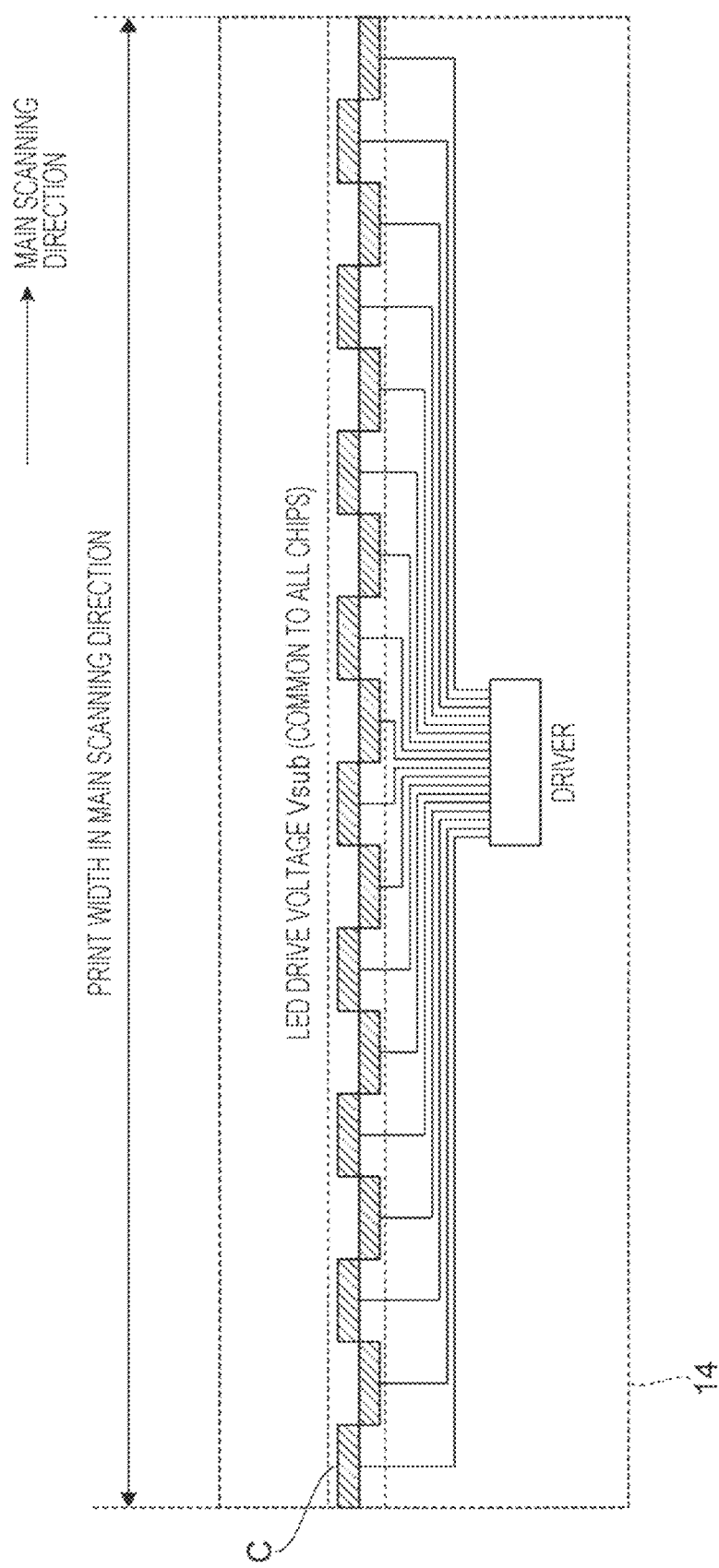
FIG. 10 is a conceptual diagram illustrating an example in the related art as a configuration example of a light-emitting element head that performs correction of the light intensity of LEDs.

FIG. 10 is a conceptual diagram illustrating an example in the related art as a configuration example of one of the light-emitting element heads 14 that performs correction of the light intensity of the LEDs 71.

Here, the average light intensity of the entire light-emitting element head 14 is adjusted by the drive voltage of the LEDs 71.

A single driver that is included in the light-emitting element head 14 adjusts the light intensity of each of the LEDs 71 only by the light emission time. The driver performs control of light emission of the LEDs 71 including correction of light intensity. The driver may be one of the functions of the signal generation circuit 100.

<Description of Method for Correcting Density Unevenness>

In the present exemplary embodiment, the LEDs 71 are divided into a plurality of groups, and the driver uniformly corrects the light intensity of each of the LEDs 71 included in the groups on a group-by-group basis by the first correction method so as to correct density unevenness in the main scanning direction.

In this case, the first correction method is a method of adjusting the average light intensity of the LEDs 71 included in each of the groups. More specifically, the method of adjusting the average light intensity is a method of adjusting the average light intensity by changing the voltage applied to the LEDs 71. Note that the method of adjusting the average light intensity may be a method of adjusting the average light intensity by changing the current supplied to the LEDs 71.

The driver performs the correction using the first correction method and also individually corrects the light intensity of each of the LEDs 71 included in each of the groups by a second correction method so as to further correct the density unevenness in the main scanning direction.

In this case, the second correction method is a method of adjusting the light emission time of each of the LEDs 71.

Figure 11:
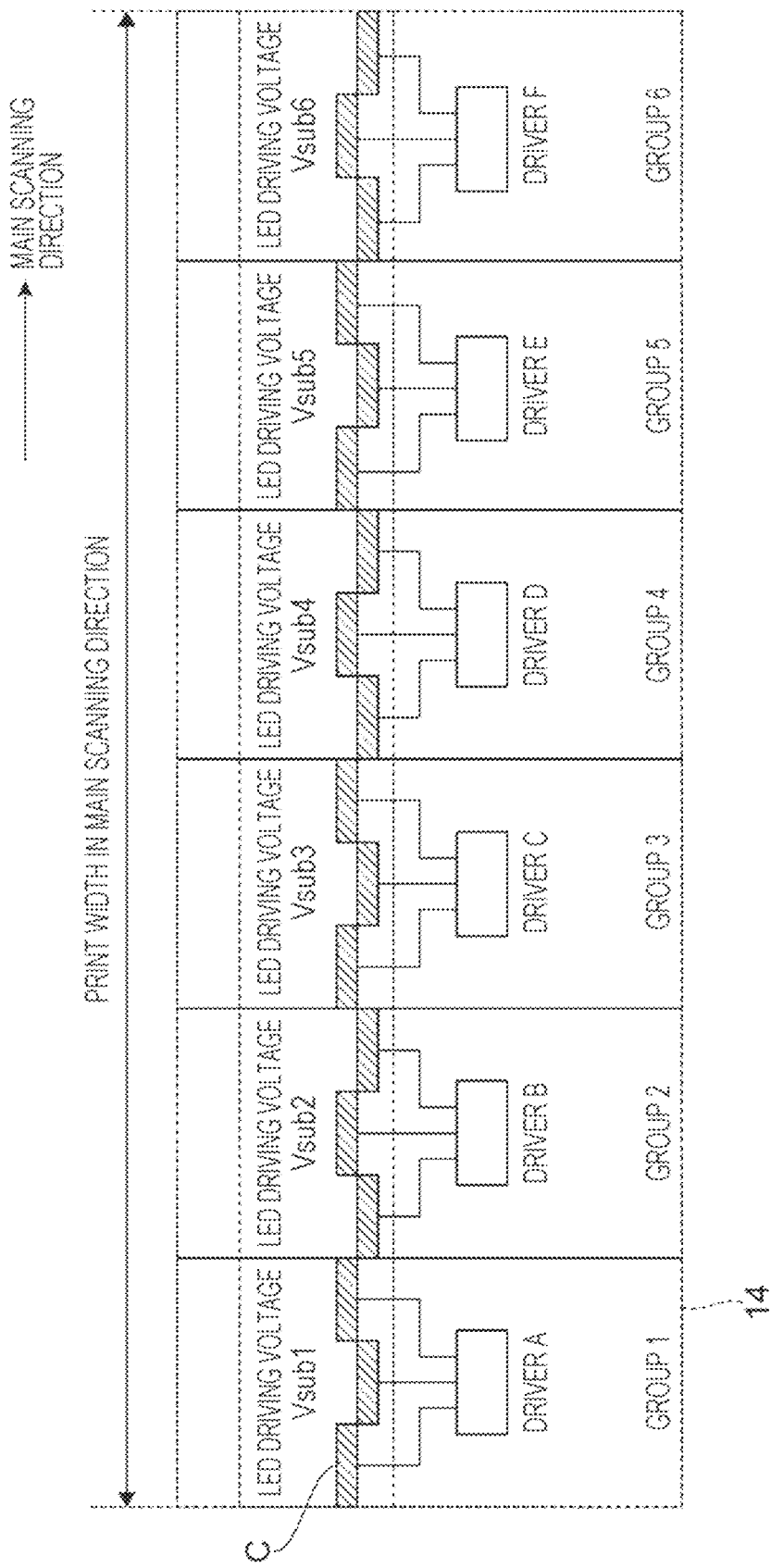
FIG. 11 is a diagram illustrating a first example of a method of dividing LEDs into a plurality of groups.

FIG. 11 is a diagram illustrating a first example of a method of dividing the LEDs 71 into a plurality of groups.

FIG. 11 illustrates the case where the LEDs 71 are divided into six groups. In FIG. 11, the six groups are referred to as groups 1 to 6. Each of the groups 1 to 6 is provided with one of drivers A to F, and each of the drivers A to F performs control so as to cause the LEDs 71 that belong to the corresponding group to emit light.

In this case, first, each of the drivers A to F uniformly corrects the light intensity of each of the LEDs 71 included in a corresponding one of the groups 1 to 6 by adjusting the voltage applied to the LEDs 71. It may also be said that the average light intensity of the LEDs 71 that belong to each of the groups 1 to 6 is adjusted by adjusting the voltage applied to the LEDs 71 included in the group. In addition, each of the drivers A to F individually corrects the light intensity of each of the LEDs 71 included in a corresponding one of the groups 1 to 6 by adjusting the light emission time.

In other words, the drivers A to F uniformly correct the light intensities of the LEDs 71 included in their respective groups 1 to 6 by adjusting the voltages applied to the LEDs 71 so as to roughly adjust the light intensities of the LEDs 71. In addition, the drivers A to F individually correct the light intensities of the LEDs 71 included in their respective groups 1 to 6 by adjusting the light emission times of the LEDs 71 so as to perform a fine adjustment of the light intensities of the LEDs 71.

In this case, the region in which the LEDs 71 of the LPH bar 631*a* are arranged is divided into halves such that the center of the region in the main scanning direction corresponds to the boundary between the half portions, and the first half portion and the latter half portion are set as the group 1 and the group 2, respectively. Similarly, the region in which the LEDs 71 of the LPH bar 631*b* are arranged is divided into halves such that the center of the region in the main scanning direction corresponds to the boundary between these half portions, and the first half portion and the latter half portion are set as the group 3 and the group 4, respectively. The region in which the LEDs 71 of the LPH bar 631*c* are arranged is divided into halves such that the center of the region in the main scanning direction corresponds to the boundary between these half portions, and the first half portion and the latter half portion are set as the group 5 and the group 6, respectively.

Figure 12:
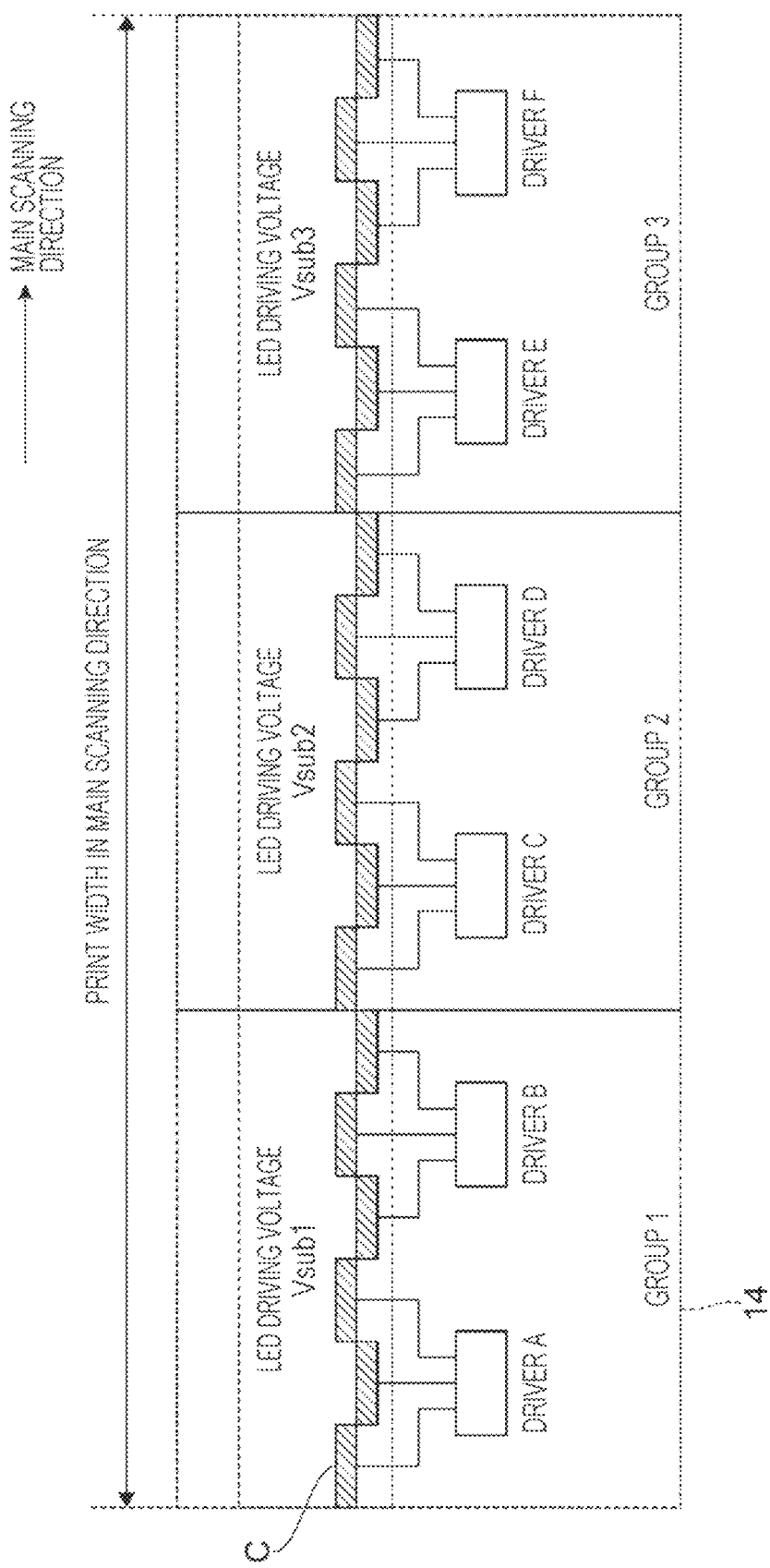
FIG. 12 is a diagram illustrating a second example of the method of dividing LEDs into a plurality of groups.

FIG. 12 is a diagram illustrating a second example of the method of dividing the LEDs 71 into a plurality of groups.

FIG. 12 illustrates the case where the LEDs 71 are divided into three groups. In FIG. 12, the three groups are referred to as groups 1 to 3. The group 1 is provided with the drivers A and B, the group 2 is provided with the drivers C and D, and the group 3 is provided with the drivers E and F. Each of the drivers A to F performs control so as to cause the LEDs 71 that belong to the corresponding group to emit light.

In this case, first, the drivers A to F uniformly correct the light intensities of the LEDs 71 included in their respective groups 1 to 3 by adjusting the voltages applied to the LEDs 71. In this case, the drivers A and B adjust the same voltage, the drivers C and D adjust the same voltage, and the drivers E and F adjust the same voltage. In addition, the drivers A to F individually correct the light intensities of the LEDs 71 included in their respective groups 1 to 3 by adjusting the light emission time.

In this case, the LEDs 71 of the LPH bar 631*a* belong to the group 1. Similarly, the LEDs 71 of the LPH bar 631*b* belong to the group 2, and the LEDs 71 of the LPH bar 631*c* belong to the group 3.

<Description of Correction of Density Unevenness in Main Scanning Direction>

The method of correcting density unevenness will now be described in further detail. Here, correction of density unevenness that occurs in the main scanning direction will be described first. In other words, the case of correcting density unevenness such as that illustrated in FIG. 7A will now be described.

Figure 13:
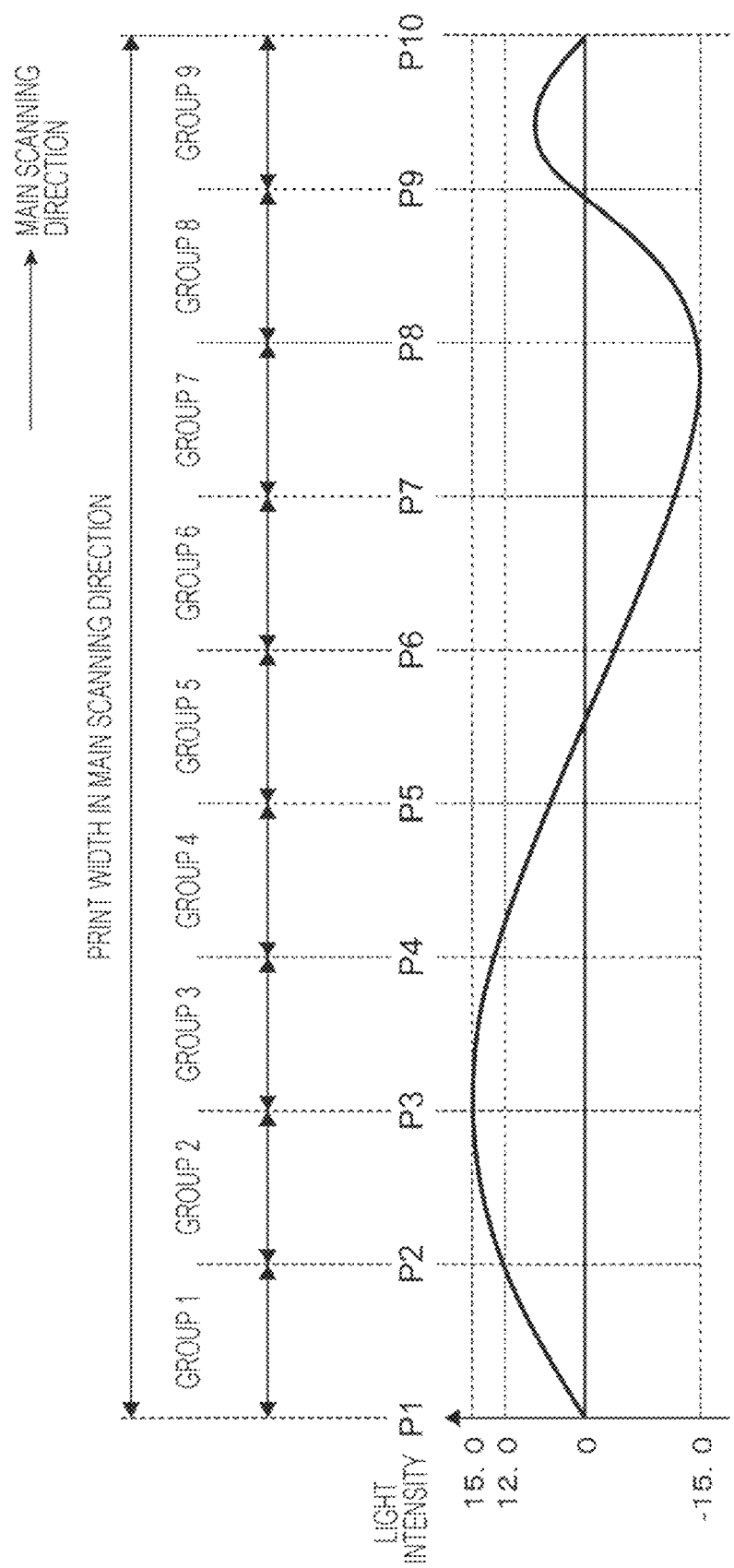
FIG. 13 is a diagram illustrating a specific method of correcting density unevenness that occurs in a main scanning direction.

FIG. 13 is a diagram illustrating a specific method of correcting density unevenness that occurs in the main scanning direction. The horizontal axis denotes position in the main scanning direction, and the vertical axis denotes the light intensity correction amount required for each of the LEDs 71. In the main scanning direction, the LEDs 71 are divided into nine groups, and these groups are referred to as groups 1 to 9 in FIG. 13.

A driver determines a correction amount, by which the density unevenness in the main scanning direction is to be corrected, on the basis of the densities of images formed by the LEDs 71 that are included in each of the groups and that are located at predetermined positions. The predetermined positions are, for example, the two ends of each of the groups. In FIG. 13, these predetermined positions are denoted by reference signs P1 to P10. In other words, the driver determines light intensity correction amounts on the basis of the densities of images formed by the LEDs 71 that are located at the starting point and the ending point of the region in which the LEDs 71 are aligned in the main scanning direction and the LEDs 71 that are located at the boundaries between the groups.

More specifically, the driver performs correction by the method of adjusting voltage, which is the first correction method, with one of the correction amounts related to the LEDs 71 that are positioned at the two ends of each group, which are the predetermined positions, the correction amount being larger than the other correction amount.

In FIG. 13, regarding the LEDs 71 at the two ends of the group 1, the light intensity correction amount set for the LED 71 at the position P1 is 0%, and the light intensity correction amount set for the LED 71 at the position P2 is 12%. In this case, the larger light intensity correction amount is 12% at the position P2. Accordingly, the driver performs correction on the group 1 in such a manner as to uniformly increase the voltage by 12% as the first correction method. As a result, the light intensities of all the LEDs 71 that belong to the group 1 is uniformly increased by 12%. In addition, the average light intensity of the LEDs 71 that belong to the group 1 is increased by 120%.

In this case, when correction for adjusting the light emission time of each of the LEDs 71 excluding the LED 71 located at the position P2 is performed by the second correction method, which is a method of adjusting light emission time, correction may be performed in such a manner as to reduce the light emission time. For example, the light emission time of the LED 71 at the position P1 is reduced by 12%. In this case, correction to increase the light emission time is less likely to be performed, and thus, it becomes easier to perform high-speed driving.

Similarly, the correction amounts of voltage by the first correction method in the groups 2 to 9 are 15%, 15%, 13%, 5%, −4%, −12%, 2%, and 2%, respectively.

Note that a value between 0% and 12% may also be used. In this case, for example, 6%, which is the average of 0% and 12%, is used as the light intensity correction amount, and the voltage is adjusted, so that the average light intensity is increased by 6%. In addition, for example, for the LED 71 at the position P2 that requires a correction amount of 12%, the remaining 3% may be adjusted by increasing the light emission time. In the above method, the light emission time is reduced, and thus, the driver needs to perform control so as to turn on/off the LEDs 71 at high speed. There is a limitation with regard to performing control so as to turn on/off the LEDs 71 at high speed, and it is difficult to reduce the light emission time indiscriminately. Thus, in the case where the light emission time becomes too short, for example, a light intensity correction amount of 6%, which is the average of 0% and 12%, may be used.

Then, the driver calculates the correction amounts of the LEDs 71 included in each of the groups excluding the LEDs 71 at the two ends of the group by interpolation based on the correction amounts of the LEDs 71 at the two ends and performs correction by the method of adjusting light emission time, which is the second correction method. The interpolation method may be, for example, linear interpolation. In this case, for example, the light intensity correction amount for the LED 71 that is located at the midpoint of the group 1 is (0%+12%)/2=6%. In the case where correction is performed by the above-mentioned first correction method with a voltage correction amount of 12%, the correction amount of the light emission time by the second correction method is 6%-12%=−6%. Note that the interpolation method is not limited to linear interpolation, and other methods such as polynomial interpolation may be used.

In the above-described correction methods, the LEDs 71 are divided into groups, and the average light intensity of the LEDs 71 in each of the groups is corrected by voltage adjustment, which is the first correction method. In addition, density correction for the individual LED 71 is performed by light emission time adjustment, which is the second correction method. As a result, only a small adjustment amount of the light intensity by the light emission time may be required. In other words, in the case illustrated in FIG. 13, in order to correct the light intensity only by the light emission time, it is necessary to increase or decrease the light emission time in a range of ±150. In contrast, in the present exemplary embodiment, the range in which the light emission time is increased or decreased may be smaller than the above range.

<Description of Correction of Density Unevenness in Subscanning Direction>

Correction of density unevenness that occurs in the subscanning direction will now be described. In other words, the case of correcting density unevenness such as that illustrated in FIG. 7B will now be described.

Figure 14:
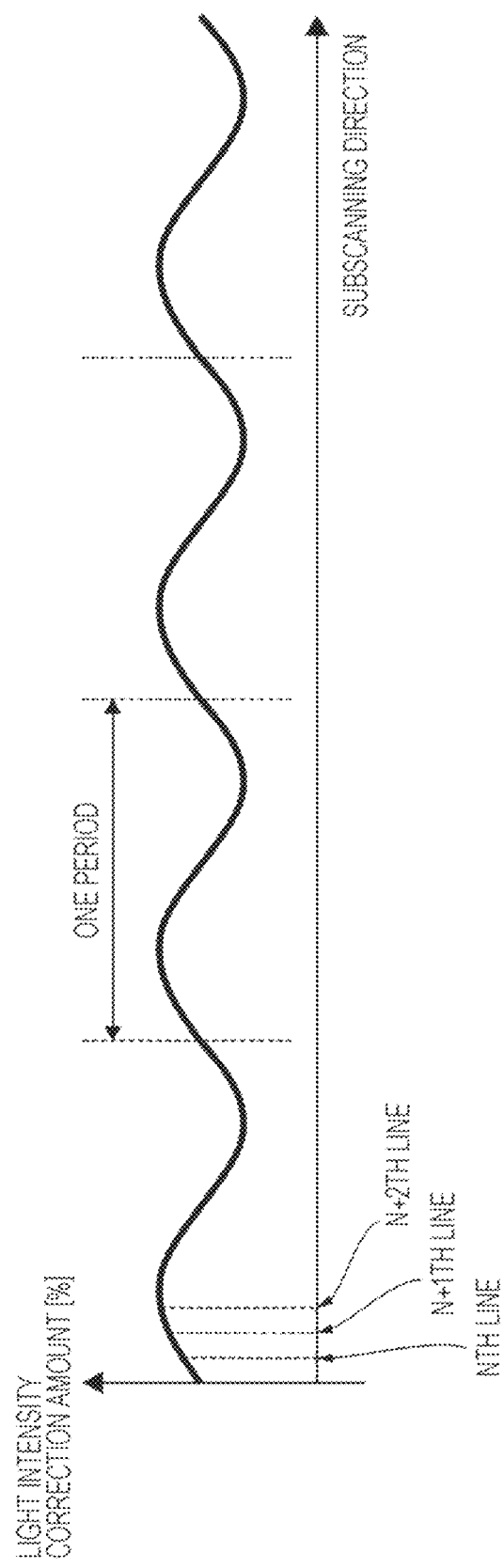
FIG. 14 is a diagram illustrating a specific method of correcting density unevenness that occurs in a subscanning direction.

FIG. 14 is a diagram illustrating a specific method of correcting density unevenness that occurs in the subscanning direction. The horizontal axis denotes position in the subscanning direction, and the vertical axis denotes the light intensity correction amount required for each of the LEDs 71. FIG. 14 illustrates the light intensity correction amount for each line, and each of the lines are referred to as an Nth line, an N+1th line, an N+2nd line, and so on.

In the present exemplary embodiment, a driver corrects, on a group-by-group basis, density unevenness that periodically occurs in the subscanning direction. Regarding density unevenness in the subscanning direction, for example, density unevenness occurs in the subscanning direction in accordance with the rotation periods of magnet rollers that are provided inside the photoconductor drums 12 or inside the developing units 15. FIG. 14 illustrates the period over which density unevenness occurs as one period. Even in the case where density unevenness occurs in the subscanning direction due to other factors, the density unevenness often occurs periodically. Thus, in order to correct density unevenness in the subscanning direction, it is effective to focus on periodic density unevenness.

In the present exemplary embodiment, the driver corrects a direct-current component (DC component) of periodic density unevenness by voltage adjustment, which is the first correction method, and corrects an alternating-current component (AC component) of periodic density unevenness by light emission time adjustment, which is the second correction method.

By correcting density unevenness in the subscanning direction by the above-mentioned correcting methods, the adjustment amount of the light intensity by the light emission time may further be reduced.

In addition, voltage adjustment, which is the first correction method, may be changed for each of the lines, which are referred to as the Nth line, the N+1th line, the N+2nd line, and so on, and the light intensity correction amount that is indicated by a bold line in FIG. 14 may be corrected by voltage adjustment, which is the first correction method. That is to say, in this case, both the direct-current component (DC component) and the alternating-current component (AC component) are adjusted by voltage.

In this case, light emission time adjustment, which is the second correction method, may only be performed in the main scanning direction.

<Description of Functional Configuration of Signal Generation Circuit 100>

A functional configuration of the signal generation circuit 100 will now be described.

Figure 15:
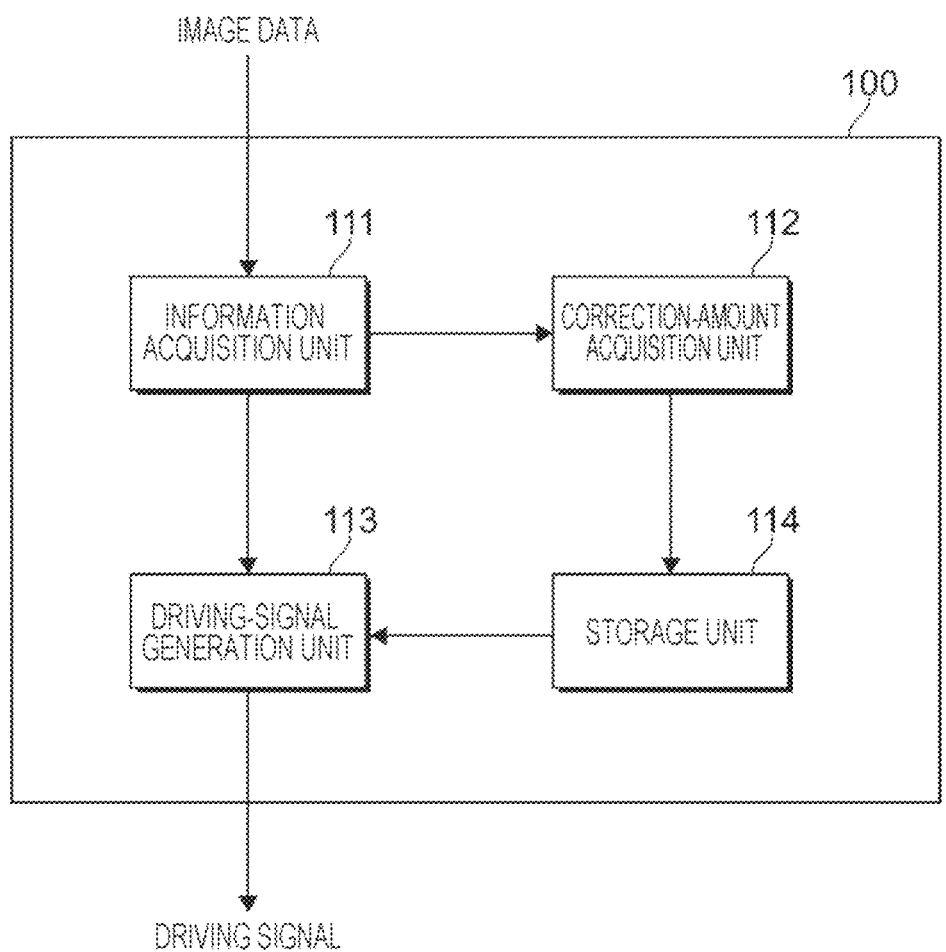
FIG. 15 is a block diagram illustrating a functional configuration example of a signal generation circuit in the present exemplary embodiment.

FIG. 15 is a block diagram illustrating a functional configuration example of the signal generation circuit 100 in the present exemplary embodiment. Note that, among various functions of the signal generation circuit 100, those relating to the present exemplary embodiment are selected and illustrated in FIG. 15.

As illustrated in FIG. 15, the signal generation circuit 100 includes an information acquisition unit 111 that acquires, for example, image data, a correction-amount acquisition unit 112 that calculates a correction amount by which density unevenness is to be corrected, a driving-signal generation unit 113 that generates a driving signal, and a storage unit 114 that stores correction data.

The information acquisition unit 111 receives image data from the image-output control unit 200. This image data is, as mentioned above, image data that has been input from an external apparatus such as a personal computer (PC) and that has undergone image processing or the like performed by the image-output control unit 200 so as to be usable in image formation performed by the image forming units 11. For example, the image processing is specifically rasterization processing, color conversion processing, pile height processing, screen processing, or the like.

In addition, the information acquisition unit 111 acquires image data that is a result obtained by reading a density-unevenness measurement chart for calculating correction unevenness.

The correction-amount acquisition unit 112 calculates a correction amount by which density unevenness is to be corrected on the basis of the image data of the density-unevenness measurement chart acquired by the information acquisition unit 111. The correction amount includes a correction amount of voltage corrected by the above-described first correction method and a correction amount of the light emission time of each of the LEDs 71 corrected by the above-described second correction method.

The driving-signal generation unit 113 generates a driving waveform for turning on each of the LEDs 71 and outputs the driving waveform as a driving signal. More specifically, for example, the driving-signal generation unit 113 generates driving waveforms of the light emission signals φ1, the start transfer signal φS, the first transfer signal φ1 and the second transfer signal φ2, which have been mentioned above, and outputs these driving waveforms as driving signals. In this case, the driving-signal generation unit 113 outputs driving signals corresponding to the correction amount of the voltage and the correction amount of the light emission time of each of the LEDs 71.

The storage unit 114 stores, as the correction amount calculated by the correction-amount acquisition unit 112, the voltage correction amount determined for each group and the light-emission-time correction amount determined for each of the LEDs 71.

<Description of Operation of Image Forming Apparatus 1>

Operation of the image forming apparatus 1 when calculating a correction amount by which density unevenness is to be corrected will now be described.

Figure 16:
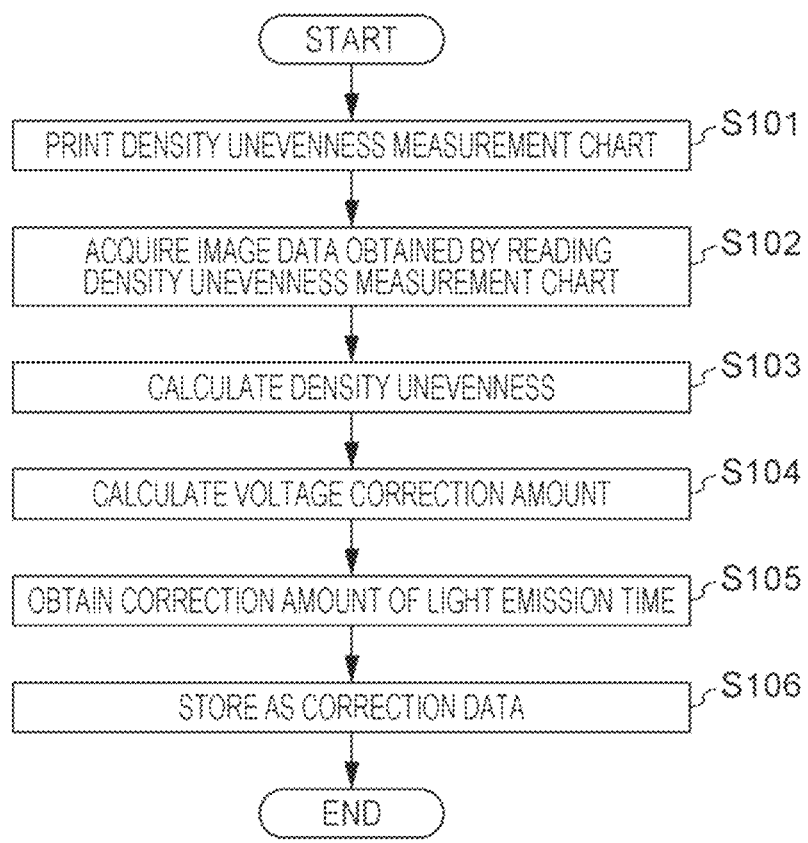
FIG. 16 is a flowchart illustrating an operation of the image forming apparatus when calculating a correction amount by which density unevenness is corrected.

FIG. 16 is a flowchart illustrating an operation of the image forming apparatus 1 when calculating a correction amount by which density unevenness is corrected.

First, a density-unevenness measurement chart is printed by the image forming apparatus 1 (step 101). For example, the density-unevenness measurement chart is an image having a uniform density and is printed for each toner color used in the image forming apparatus 1.

Next, the information acquisition unit 111 acquires image data obtained by reading the density-unevenness measurement chart (step 102). For example, the density-unevenness measurement chart is read by a scanner or the like. Alternatively, the density-unevenness measurement chart may be read by a sensor that reads an image formed as a result of toner images being fixed to one of the sheets P by the fixing device 50. This sensor is also called an in-line sensor.

Then, the correction-amount acquisition unit 112 calculates density unevenness on the basis of the image data obtained by reading the density-unevenness measurement chart (step 103).

In addition, the correction-amount acquisition unit 112 converts the calculated density unevenness into the light intensity correction amount of each of the LEDs 71 by a predetermined arithmetic expression.

In this case, the correction-amount acquisition unit 112 first calculates the light intensity correction amounts of the LEDs 71 that are positioned at the two ends of each group for correcting the density unevenness and sets the larger light intensity correction amount as the light intensity correction amount to be used in the actual correction. Then, the voltage correction amount that corresponds to this light intensity correction amount is calculated (step 104). As a result, the voltage correction amount for each group is calculated.

Subsequently, the light intensity correction amounts of the LEDs 71 that are positioned at the two ends of each group are interpolated so as to calculate the light intensity correction amounts for the LEDs 71 between the LEDs 71 at the two ends. Then, the light-emission-time correction amounts corresponding to the light intensity correction amounts are calculated (step 105). As a result, the light-emission-time correction amount for each of the LEDs 71 is determined.

After that, the storage unit 114 stores, as correction data, the voltage correction amount determined for each group and the light-emission-time correction amount determined for each of the LEDs 71, which are the correction amounts calculated by the correction-amount acquisition unit 112 (step 106).

When printing is actually performed, the driving-signal generation unit 113 refers to the storage unit 114 so as to generate driving signals on the basis of the two correction amounts, which are the voltage correction amount determined for each group and the light-emission-time correction amount determined for each of the LEDs 71, and outputs the driving signals. As a result, printing is performed in a state where the density unevenness has been corrected.

Note that, although the correction using the first correction method and the correction using the second correction method are both performed in the above-described exemplary embodiment, if variations in light intensity among the LEDs 71 are small, there is a case where density unevenness is correctable by only performing the correction using the first correction method. Thus, it is not essential to perform the correction using the second correction method.

In addition, in the above-described exemplary embodiment, the storage unit 114 stores the correction data, and the correction data is acquired from the storage unit 114 when printing is performed. In practice, the correction data is set beforehand in the driver. However, the present disclosure is not limited to this configuration, and for example, the correction data may be sent from an external controller that is provided outside each of the light-emitting element heads 14. In this case, the correction data is sent in real time in synchronization with the image data to be printed. The external controller may be, for example, one of the functions of the image-output control unit 200.

Furthermore, although the three LPH bars 631, which are the LPH bars 631a to 631c, are used in the above-described exemplary embodiment, the number of LPH bars 631 may be any number. For example, the number of LPH bars 631 may be one as long as the required number of LEDs 71 are able to be arranged in the single LPH bar 631.

In the above-described exemplary embodiment, although each of the light-emitting element heads 14 included in the image forming apparatus 1 have been described as a light emitting device, the present disclosure is not limited to this.

Figure 17:
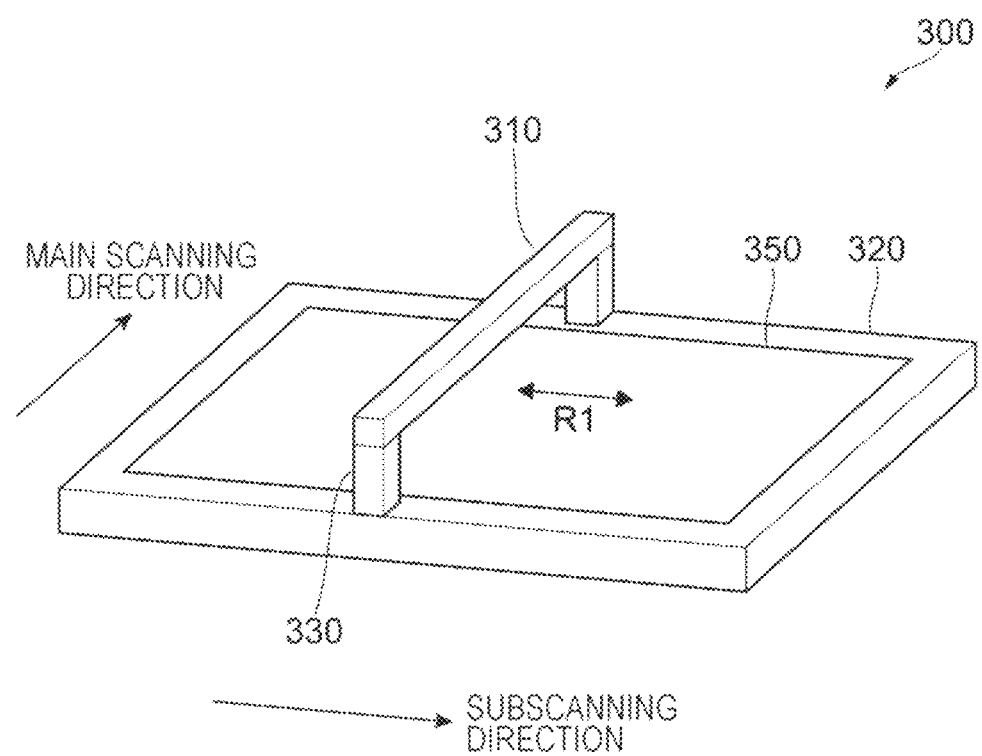
FIG. 17 is a diagram illustrating another example of a light emitting device.

FIG. 17 is a diagram illustrating another example of the light emitting device.

The light emitting device illustrated in FIG. 17 is an exposure head 310 that performs light exposure on a planar exposure surface. The exposure head 310 is included in an exposure device 300.

For example, the exposure device 300 is used for light exposure of a dry film resist (DFR) in a process of manufacturing a printed wiring board (PWB), formation of a color filter in a process of manufacturing a liquid crystal display (LCD), light exposure of a DFR in a process of manufacturing a thin film transistor (TFT), or light exposure of a DFR in a process of manufacturing a plasma display panel (PDP).

The exposure device 300 includes, in addition to the exposure head 310, an exposure table 320 on which a substrate 350 is placed and a moving mechanism 330 that moves the exposure head 310.

The exposure head 310 has a configuration similar to that of each of the above-described light-emitting element heads 14. In other words, the exposure head 310 includes the light emitting unit 63 including the plurality of LEDs 71, the circuit board 62 on which the light emitting unit 63, the signal generation circuit 100, and so forth are mounted, and the rod lens array 64 that focuses the light outputs emitted by the LEDs 71. The light emitting unit 63 includes the LPH bars 631, the focus adjustment pins 632, and the signal generation circuit 100.

The exposure table 320 is a placement table on which the substrate 350, which is a target of light exposure, is placed. The above-mentioned DFR is placed on the substrate 350, and light exposure is performed on the substrate 350.

As illustrated in FIG. 14, the moving mechanism 330 causes the exposure head 310 to reciprocate in a direction that is indicated by double-headed arrow R1 and that is parallel to the subscanning direction. As a result, the exposure head 310 scans the DFR or the like in the main scanning direction and also scans the DFR or the like in the subscanning direction by being moved.

Note that, although the exposure head 310 is moved in this case, the light exposure may be performed by moving the exposure table 320 in the subscanning direction.

Figure 18:
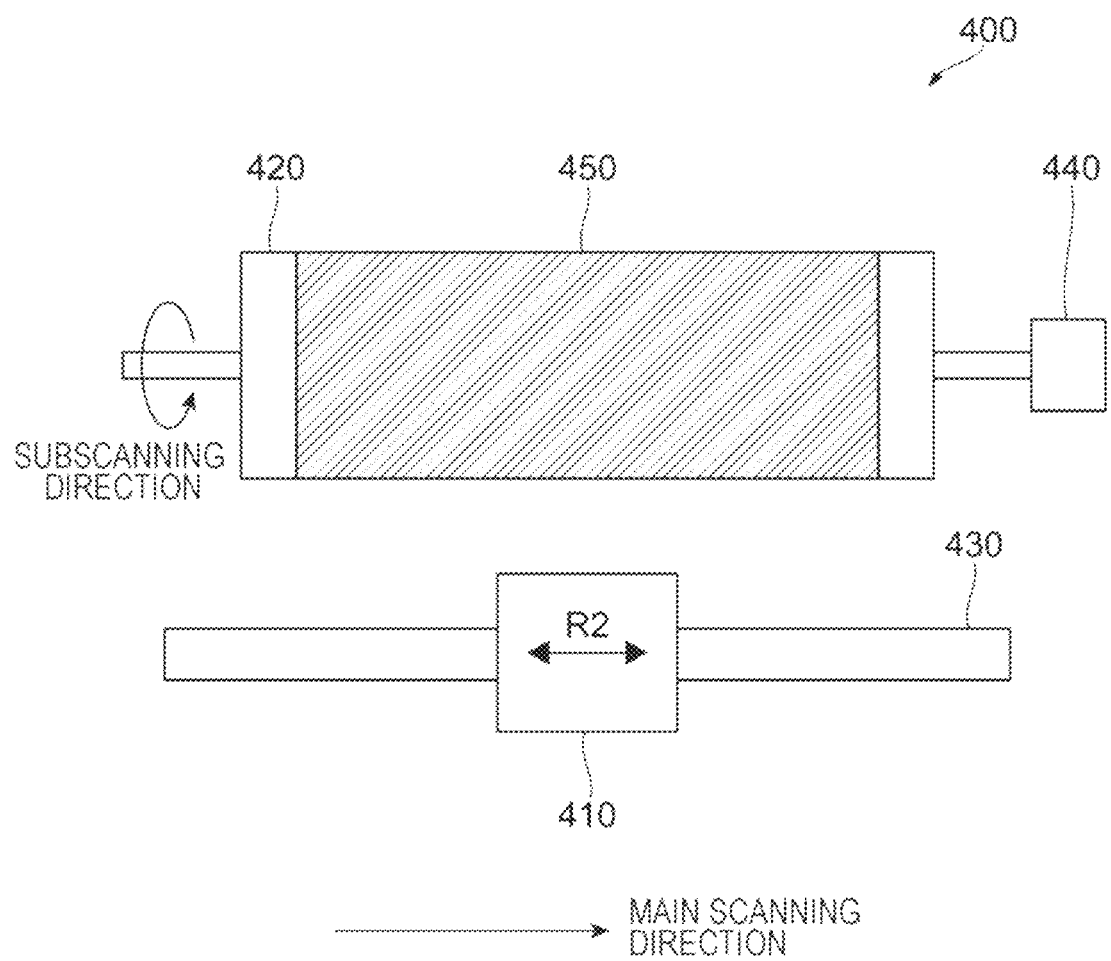
FIG. 18 is a diagram illustrating another example of the light emitting device.

FIG. 18 is a diagram illustrating another example of the light emitting device.

The light emitting device illustrated in FIG. 15 is an exposure head 410 that performs light exposure on an exposure surface having a curved shape. The exposure head 410 is included in an image recording apparatus 400.

The image recording apparatus 400 is, for example, a computer-to-plate (CTP) image output device that performs an image recording operation directly onto a recording material.

The image recording apparatus 400 includes, in addition to the exposure head 410, a rotary drum 420 that holds a recording material 450, a moving mechanism 430 that moves the exposure head 410, and a rotation mechanism 440 that rotates the rotary drum 420.

The exposure head 410 has a configuration similar to that of each of the above-described light-emitting element heads 14.

By rotating the rotary drum 420, the recording material 450 is rotated along with the rotary drum 420.

The moving mechanism 430 causes the exposure head 410 to reciprocate in a direction that is indicated by double-headed arrow R2 and that is parallel to the main scanning direction, so that the exposure head 410 performs a scanning operation in the main scanning direction. The moving mechanism 430 is, for example, a linear motor.

The rotation mechanism 440 rotates the rotary drum 420, so that the recording material 450 is moved in the subscanning direction so as to be exposed to light.

Note that although the single exposure head 410 is provided in this case, a plurality of exposure heads 410 may be provided so as to share the scanning operation in the main scanning direction.

Although the exemplary embodiment of the present disclosure has been described above, the technical scope of the present disclosure is not limited to the scope described in the above exemplary embodiment. It is obvious from the description of the claims that other exemplary embodiments obtained by making various changes and improvements to the above-described exemplary embodiment are also within the technical scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light emitting device comprising:
    a light-emitting element row that includes light emitting elements arranged in a row in a main scanning direction;
    an optical element configured for forming an electrostatic latent image by focusing light outputs of the light emitting elements and exposing a photoconductor to light; and
    a controller configured to control light emission of the light-emitting element row,
    wherein the light-emitting element row is divided into a plurality of groups,
    wherein the controller is configured to uniformly correct a light intensity of each of the light emitting elements included in the groups on a group-by-group basis using a first correction method so as to correct density unevenness in the main scanning direction,
    wherein the controller is further configured to individually correct the light intensity of each of the light emitting elements included in each of the groups using a second correction method so as to further correct the density unevenness in the main scanning direction,
    wherein the controller is configured to determine a correction amount by which density unevenness in the main scanning direction is to be corrected using a density of an image formed by at least one of the light emitting elements included in each of the groups, the at least one of the light emitting elements being located at a predetermined position, and
    wherein the controller is configured to perform correction using the first correction method with one of correction amounts relating to the light emitting elements that are positioned at two ends of each of the groups and that are included in the at least one light emitting element located at the predetermined position, the correction amount being larger than the other correction amount.

2. The light emitting device according to claim 1, wherein the first correction method comprises adjusting an average light intensity of the light emitting elements included in each of the groups, and
    wherein the second correction method comprises adjusting a light emission time of each of the light emitting elements.

3. The light emitting device according to claim 2, wherein the first correction method comprises adjusting the average light intensity by changing a voltage that is applied to the light emitting elements.

4. The light emitting device according to claim 1, wherein the controller is configured to calculate correction amounts of the light emitting elements included in each of the groups excluding the light emitting elements at the two ends of the group by interpolation based on the correction amounts of the light emitting elements at the two ends and to perform correction using the second correction method.

5. A light emitting device comprising:
a light-emitting element row that includes light emitting elements arranged in a row in a main scanning direction;
an optical element configured for forming an electrostatic latent image by focusing light outputs of the light emitting elements and exposing a photoconductor to light; and
a controller configured to control light emission of the light-emitting element row,
wherein the light-emitting element row is divided into a plurality of groups,
wherein the controller is configured to uniformly correct a light intensity of each of the light emitting elements included in the groups on a group-by-group basis using a first correction method so as to correct density unevenness in the main scanning direction wherein the controller is further configured to individually correct the light intensity of each of the light emitting elements included in each of the groups using a second correction method so as to further correct the density unevenness in the main scanning direction,
wherein the controller is further configured to correct periodic density unevenness in a subscanning direction on a group-by-group basis, and
wherein the controller is configured to correct a direct-current component of the periodic density unevenness by the first correction method and to correct an alternating-current component of the periodic density unevenness by the second correction method.

6. An image forming apparatus comprising:
a toner-image forming unit configured to form a toner image using a light-emitting element row that includes:
light emitting elements arranged in a row in a main scanning direction; and
an optical element configured for forming an electrostatic latent image by focusing light outputs of the light emitting elements and exposing a photoconductor to light;
a transfer unit configured to transfer the toner image onto a recording medium;
a fixing unit configured to fix the toner image transferred to the recording medium onto the recording medium in such a manner as to form an image; and
a controller configured to control light emission of the light-emitting element row,
wherein the light-emitting element row is divided into a plurality of groups,
wherein the controller is configured to uniformly correct a light intensity of each of the light emitting elements included in each of the groups using a first correction method so as to correct density unevenness in the main scanning direction,
wherein the controller is further configured to individually correct the light intensity of each of the light emitting elements included in each of the groups using a second correction method so as to further correct the density unevenness in the main scanning direction,
wherein the controller is configured to determine a correction amount by which density unevenness in the main scanning direction is to be corrected using a density of an image formed by at least one of the light emitting elements included in each of the groups, the at least one of the light emitting elements being located at a predetermined position, and
wherein the controller is configured to perform correction using the first correction method with one of correction amounts relating to the light emitting elements that are positioned at two ends of each of the groups and that are included in the at least one light emitting element located at the predetermined position, the correction amount being larger than the other correction amount.

7. A light emitting device comprising:
a light-emitting element row that includes light emitting elements arranged in a row in a main scanning direction;
an optical element configured for forming an electrostatic latent image by focusing light outputs of the light emitting elements and exposing a photoconductor to light; and
a control means for controlling light emission of the light-emitting element row,
wherein the light-emitting element row is divided into a plurality of groups, and
wherein the control means uniformly corrects a light intensity of each of the light emitting elements included in the groups on a group-by-group basis using a first correction method so as to correct density unevenness in the main scanning direction,
wherein the control means is also for individually correcting the light intensity of each of the light emitting elements included in each of the groups using a second correction method so as to further correct the density unevenness in the main scanning direction,
wherein the control means is also for determining a correction amount by which density unevenness in the main scanning direction is to be corrected using a density of an image formed by at least one of the light emitting elements included in each of the groups, the at least one of the light emitting elements being located at a predetermined position, and
wherein the control means is also for performing correction using the first correction method with one of correction amounts relating to the light emitting elements that are positioned at two ends of each of the groups and that are included in the at least one light emitting element located at the predetermined position, the correction amount being larger than the other correction amount.

* * * * *